(12) United States Patent
Gotesdyner et al.

(10) Patent No.: US 12,314,872 B2
(45) Date of Patent: *May 27, 2025

(54) METHOD AND SYSTEM FOR OPTIMIZING EXECUTION OF USER COMMANDS IN RELATION TO POWER MANAGEMENT

(71) Applicant: Aeris Communications, Inc., San Jose, CA (US)

(72) Inventors: Rony Gotesdyner, Sunnyvale, CA (US); Eran Netanel, Belmont, CA (US); Narendra Sharma, Sunnyvale, CA (US); Drew S. Johnson, San Jose, CA (US); George Edward L. Schaefer, Jr., Tulsa, OK (US); Vivek Agarwal, Foster City, CA (US)

(73) Assignee: Aeris Communications, Inc., San Jose, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 17/872,292

(22) Filed: Jul. 25, 2022

(65) Prior Publication Data

US 2022/0358382 A1 Nov. 10, 2022

Related U.S. Application Data

(63) Continuation-in-part of application No. 16/985,581, filed on Aug. 5, 2020, now Pat. No. 11,397,900, (Continued)

(51) Int. Cl.
*G06F 1/3203* (2019.01)
*G06F 1/00* (2006.01)
(Continued)

(52) U.S. Cl.
CPC ................. *G06N 5/04* (2013.01); *G06F 1/00* (2013.01); *G06F 1/3203* (2013.01); (Continued)

(58) Field of Classification Search
CPC ........ G06F 1/00; G06F 1/3203; G06F 1/3206; G06F 1/3209; G06F 1/3212; (Continued)

(56) References Cited

U.S. PATENT DOCUMENTS 6,330,676 B1 12/2001 Kelsey
7,079,904 B1 7/2006 Forstrom
(Continued)

FOREIGN PATENT DOCUMENTS

CN 1695389 A 11/2005
CN 103078359 A 5/2013
WO 2014028672 A1 2/2014

OTHER PUBLICATIONS

International Search Report from International Application No. PCT/US16/29048 dated Apr. 22, 2016.
(Continued)

*Primary Examiner* — Mohamed A. Wasel
(74) *Attorney, Agent, or Firm* — Shih IP Law Group, PLLC

(57) ABSTRACT

A computer-implemented method and system for optimizing user experience and power management are disclosed. The method includes determining power profile of a target device; determining historical behavior of at least one user in relation to the target device; considering the historical behavioral data of the at least one user in relation to the target device based on the determined power profile of the target device; using rules to select at least one of a plurality of approaches for establishing connection with a server in relation to a result of the considering; and establishing the connection with the target device based on the at least one of the plurality of approaches selected.

30 Claims, 12 Drawing Sheets

Related U.S. Application Data which is a continuation of application No. 15/982,184, filed on May 17, 2018, now Pat. No. 10,740,685, which is a continuation of application No. 14/693,757, filed on Apr. 22, 2015, now Pat. No. 9,978,018.

(51) Int. Cl.
| | |
|---|---|
| *G06F 1/3206* | (2019.01) |
| *G06F 1/3209* | (2019.01) |
| *G06F 1/3212* | (2019.01) |
| *G06F 1/3234* | (2019.01) |
| *G06N 5/04* | (2023.01) |
| *H04L 67/125* | (2022.01) |
| *H04L 67/303* | (2022.01) |
| *H04L 67/50* | (2022.01) |
| *H04W 4/18* | (2009.01) |
| *H04W 4/38* | (2018.01) |
| *H04W 4/40* | (2018.01) |
| *H04W 52/02* | (2009.01) |

(52) U.S. Cl.
CPC .......... *G06F 1/3206* (2013.01); *G06F 1/3209* (2013.01); *G06F 1/3212* (2013.01); *G06F 1/3278* (2013.01); *H04L 67/125* (2013.01); *H04L 67/303* (2013.01); *H04L 67/535* (2022.05); *H04W 4/18* (2013.01); *H04W 4/38* (2018.02); *H04W 4/40* (2018.02); *H04W 52/0258* (2013.01); *H04W 52/0254* (2013.01); *H04W 52/0277* (2013.01); *Y02D 30/70* (2020.08)

(58) Field of Classification Search
CPC ....... G06F 1/3278; G06N 5/04; H04L 67/125; H04L 67/22; H04L 67/303; H04W 4/18; H04W 4/38; H04W 4/40; H04W 52/0254; H04W 52/0258; H04W 52/0277; Y02D 10/00; Y02D 30/70

See application file for complete search history.

(56) References Cited

U.S. PATENT DOCUMENTS

| | | |
|---|---|---|
| 8,316,020 B1 | 11/2012 | Kleinmann |
| 8,655,307 B1 | 2/2014 | Walker |
| 8,958,854 B1 | 2/2015 | Morley |
| 9,420,056 B2 | 8/2016 | Ellis |
| 9,888,441 B2 | 2/2018 | Liang |
| 2006/0259621 A1 | 11/2006 | Ranganathan et al. |
| 2009/0254909 A1 | 10/2009 | Hanson et al. |
| 2010/0105449 A1 | 4/2010 | Shi |
| 2010/0115259 A1 | 5/2010 | Elsila |
| 2010/0194632 A1 | 8/2010 | Raento |
| 2011/0153108 A1 | 6/2011 | Yoon |
| 2011/0185356 A1 | 7/2011 | Shetty et al. |
| 2012/0016618 A1 | 1/2012 | Astigarraga et al. |
| 2012/0260112 A1 | 10/2012 | Kashyap |
| 2012/0323368 A1 | 12/2012 | White |
| 2013/0107727 A1 | 5/2013 | Lundén |
| 2013/0210481 A1 | 8/2013 | Sane |
| 2013/0318521 A1 | 11/2013 | Monaghan et al. |
| 2014/0159485 A1 | 6/2014 | Daniel |
| 2015/0215816 A1 | 7/2015 | Abou-Elkheir |
| 2016/0080520 A1 | 3/2016 | Wang |
| 2016/0262108 A1 | 9/2016 | Weast |
| 2016/0291671 A1 | 10/2016 | Rider |

OTHER PUBLICATIONS

Chinese Office Action dated Jul. 30, 2019.
European Extended Search Report dated Nov. 28, 2018.

METHOD AND SYSTEM FOR OPTIMIZING EXECUTION OF USER COMMANDS IN RELATION TO POWER MANAGEMENT

CROSS-REFERENCE TO RELATED APPLICATION

This application is a Continuation-In-part of U.S. application Ser. No. 16/985,581, filed Aug. 5, 2020; which is a Continuation of U.S. application Ser. No. 15/982,184, filed May 17, 2018; which is a Continuation of U.S. application Ser. No. 14/693,757, filed Apr. 22, 2015, now U.S. Pat. No. 9,978,018, issued May 22, 2018, all of which are incorporated herein by reference in their entirety.

FIELD OF THE INVENTION

The present invention relates generally to wireless services and more particularly to devices enabled for connectivity to cellular or other wireless service and service optimization for execution of user commands in relation to management of usage of power and communications resources by such devices.

BACKGROUND

Many devices may be controlled or operated through instructions delivered wirelessly by remote devices. When a "target" device is in a low power state and not actively connected to communications networks to save energy or battery and reduce usage of communications resources, there is often a significant delay between the issuance of a command from the remote device and execution of the command.

Accordingly, it is desired to provide a method and system for optimization of approaches for establishing communications between remote and target devices that balance the user's desire for rapid execution of user instructions with effective management of power and communications resources by the target devices.

SUMMARY OF THE INVENTION

A computer-implemented method and system for optimizing user experience in relation to effective management of power and communication resources are disclosed.

In a first aspect, the computer-implemented method comprises determining a power profile of a device, determining historical behavior of at least one user and using a criterion based on power profile for checking the historical behavior of the at least one user. The criterion is used for selecting at least one of a plurality of approaches for establishing communications with the device wherein (1): if the determined power profile is a first predetermined profile, the device establishes a connection for receiving commands when the at least one user initiates a remote application to issue a command to the device but before the command is issued; (2) if the determined power profile is a second predetermined profile, the device establishes a connection for receiving commands based on the historical behavior of the at least one user; and (3) if the determined power profile of the device is a third predetermined profile, the device establishes a connection for receiving commands only when the at least one user issues a command.

In a second aspect, the computer-implemented system comprises a processor and a memory in communication with the processor wherein the memory contains program instructions which, when executed by the processor, perform operations which include determining a power profile of a device; determining historical behavior of at least one user; and using a criterion based on power profile for checking the historical behavior of the at least one user. The criterion is used for selecting at least one of a plurality of approaches for establishing communications with the device wherein (1): if the determined power profile is a first predetermined profile, the device establishes a connection for receiving commands when the at least one user initiates a remote application to issue a command to the device but before the command is issued; (2) if the determined power profile is a second predetermined profile, the device establishes a connection for receiving commands based on the historical behavior of the at least one user; and (3) if the determined power profile of the device is a third predetermined profile, the device establishes a connection for receiving commands only when the at least one user issues a command.

In one or more embodiment, a computer-implemented method, system and computer program product for optimizing user experience are disclosed. The method includes determining power profile of a target device; determining historical behavior of at least one user in relation to the target device; considering the historical behavioral data of the at least one user in relation to the target device based on the determined power profile of the target device; and using rules to select at least one of a plurality of approaches for establishing connection with the server in relation to a result of the considering.

The system for optimizing user experience and power management comprising a target device, at least one database and at least one server, the at least one server including a processor, a memory in communication with the processor, wherein the at least one server determines historical behavior of at least one user based on a set of parameters related to the target device; and wherein the target device determines a power profile of the target device, considers historical behavioral data of the at least one user based on the determined power profile; and uses rules to select at least one of a plurality of approaches for establishing connection with the at least one server in relation to a result of the considering.

The non-transitory computer-readable medium having executable instruction store therein that, when executed, cause one or more processors corresponding to a system having a target device, a database and a server, the server including a processor, a memory in communication with the processor, to perform operations comprising: determining historical behavior of at least one user; determining a power profile of the target device; considering historical behavioral data of the at least one user based on the determined power profile of the target device; and using rules to select at least one of a plurality of approaches for establishing connection with the server in relation to a result of the considering.

In one or more embodiments, the method, system and computer program product further include powering up one or more components of the target device.

DETAILED DESCRIPTION

Figure 1:
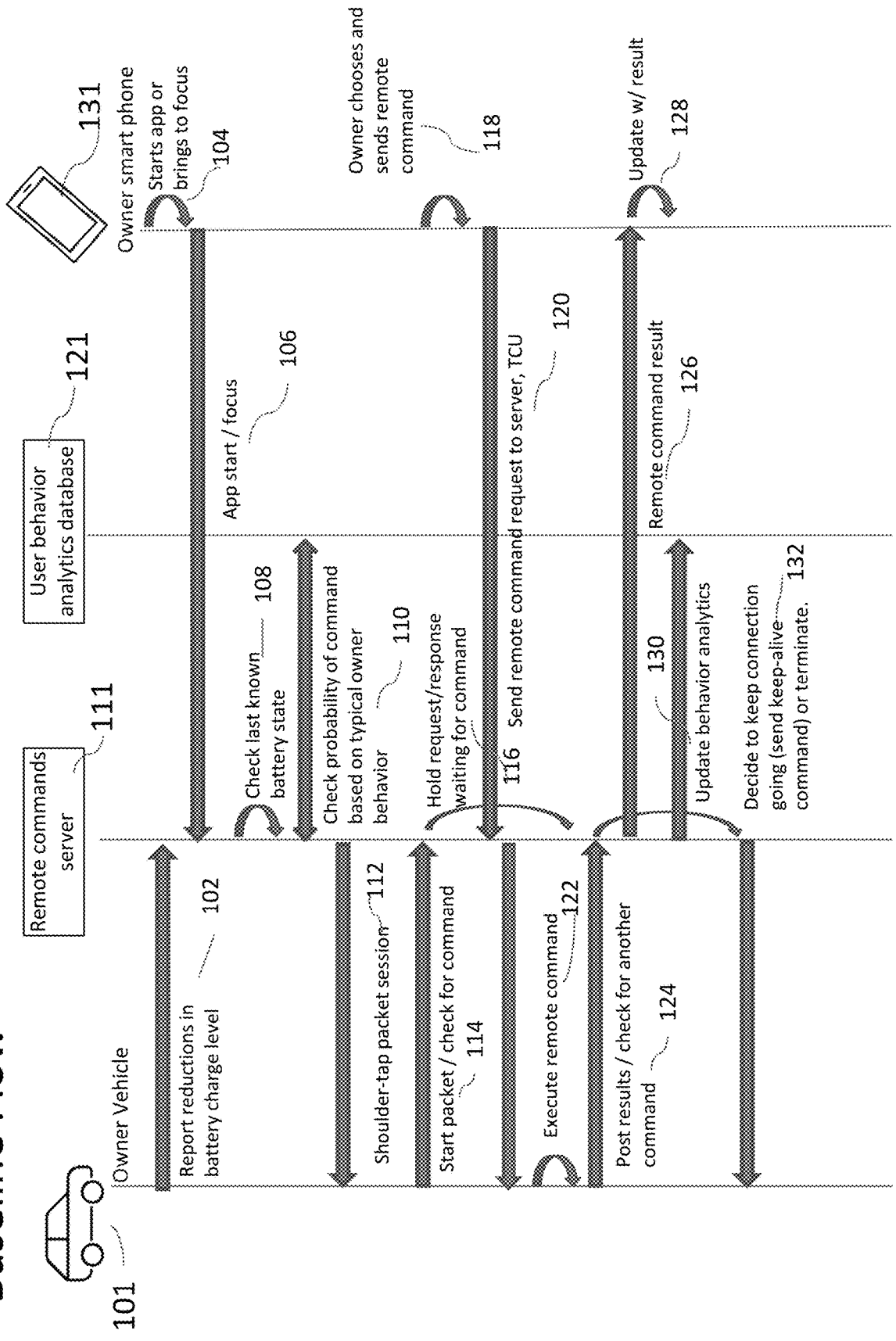
FIG. 1 illustrates a baseline flow diagram of a method for selecting an approach for establishing communications with a target device to enable execution of commands from a user with possible consideration of either or both of the power profile of a target device and the historical behavior of at least one user.

The present invention relates generally to wireless services and more particularly to devices enabled for connectivity to cellular or other wireless service and optimization for execution of user commands in relation to power management of such devices.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Although the invention is described with respect to an application for devices enabled for connectivity to cellular or other wireless service and optimization for execution of user commands in relation to power management of such devices, in M2M domain, as used herein the term "application" is intended to be inclusive, interchangeable, and/or synonymous with other similar applications as described further below, though one will recognize that functionally different types of applications may have characteristics, functions and/or operations which may be specific to their individual capabilities and/or deployment.

Machine to machine (M2M) network communications involve technologies to communicate with other devices often of similar abilities, different from traditional cellular communication networks for instance. In basic M2M environments, a device having limited logic (such as a sensor, meter, etc.) and limited resources (such as computing power) is resident at a location to typically capture measurable event data (such as temperature, pressure, quantity, available power etc.). The device is connected through a communications network to a remote computer or server having an application layer of specific software. The data received from the device is converted to relevant information associated with the measured event data through the application and may often thereafter undergo analysis or further similar assessment. In many cases a device, when activated, may trigger and communicate the events it is intended for so that those communicated events will then be acted upon by other machines, applications, and/or users on the network.

M2M environments often involve systems of networks, wired and wireless, that are to be connected to the internet and include personal appliances and similar devices. In M2M networks, typically devices may be stationary or mobile and be connected via wired or wireless access protocols, often through WiFi network protocols or a 3GPP Mobile network protocol. These devices may also have seasonal and/or elastic connectivity needs (e.g., agricultural business needs, store and forward capability). Often in busy M2M networks, there is an 'always on' device being used such as a general packet radio services (GPRS) or internet gateway. However, M2M communication infrastructure remains most suited to the communication needs and patterns of devices having similar abilities, characteristically, for communicating with other systems and devices on the same network.

As used herein the terms device, third party system, smart phone, terminal, remote device, target device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Many devices may be controlled or operated through instructions delivered wirelessly by remote devices. When a "target" device is in a low power state and not actively connected to communications networks to save energy or battery and reduce usage of communications resources, there is often a significant delay between the issuance of a command from the remote device and execution of the command. This delay can materially reduce user satisfaction with the experience of using the remote device to control or operate the target device, especially when the user tends to issue given instructions frequently, at regular times or in predictable circumstances, such as within a given physical proximity. The alternative of maintaining the target device in a full power state and actively connected to communications networks to optimize for rapid initiation and response to instructions issued by the user's remote device, however, could result in shortening the duration of target device battery charge or increasing its consumption of energy and use of communications resources and thus reduce user satisfaction with management of power and communications resources by target devices.

Accordingly, it is desired to provide a method and system for optimization of approaches for establishing communications between remote and target devices that balance the user's desire for rapid execution of user instructions with effective management of power and communications resources by the target devices.

It is generally known that for a remote device to issue instructions to another "target" device, a mechanism is needed to establish, actively maintain, or manage a valid wireless connection between the remote device and the other device, such as by infrared, Wi-Fi or cellular connections. Instructions issued by remote devices operating at close range, such as infrared "line of sight" devices, can be executed effectively immediately if the target device is powered on. However, remote devices capable of operating from great distances over cellular networks, such as wireless phones and other wireless devices ("remote devices"), must often initiate an active data session through public and private networks in order to communicate with and instruct the target device, such as an M2M device.

In order for a wireless communication to be received, understood and acted upon by a target device, the target device must generally be in a sufficiently powered state to operate and must have an active data session established with the wireless network. However, where the target device has been placed in a lower power mode and data sessions have been terminated to save battery, energy or use of wireless resources, delivering an instruction requested by the user may be delayed for the time necessary to deliver an initial "shoulder tap" message from the wireless network. The shoulder tap message instructs the target device to establish a data session with the wireless network in order to respond to any user command that may be communicated. If the device is in low power mode at the time the shoulder tap message is received, the target device may also be required to return to operating power level in order to establish the data session. Optimizing a target device for efficient use of power and communications resources thus frequently results in a delay. The delay can persist for many seconds between the user using a remote device operating over wireless networks to issue an instruction and the target device responding to that instruction. The delay can materially reduce user satisfaction in using the application on the remote device to control or operate the target device, especially when the user tends to issue given instructions frequently, at regular times or in predictable circumstances, such as within a given physical proximity.

There are two simple alternatives for reducing response time: 1) optimizing for rapid initiation and completion of instructions issued by the user's remote device by maintaining the target device in a full power state and keeping a data session with the wireless network continuously active, or 2) bringing the target device to that full power state and initiating a data session every time the user initiates an application on the remote device, even if the user is known from past behavior not to issue commands under the circumstances existing at the time. Each of these alternatives could result in depleting the target device battery charge or increasing its energy consumption as well as increasing consumption of communications resources. Both alternatives could result in the reduction of user satisfaction with how power and communications resources are managed by the remote instruction application.

Accordingly, what is desired is to provide a method and system for the optimization of approaches for establishing communications between remote and target devices that balance user desire for rapid execution of user instructions with effective management of the use of power and communications resources by the target devices.

Although there are many environments in which optimizing the balance between rapid execution of user commands issued from a remote device with effective management of the use of power and communications resources for a target device would be advantageous, a significant use case is the automotive industry.

Many automobiles are equipped with a target device such as a telematics control unit ("TCU") that is enabled for wireless communication, typically over cellular networks. The TCU is used for communication with the user or other parties, such as an original equipment manufacturer ("OEM") or an entity that provides telematics or other information management services and for delivery of commands to other vehicle systems (such as "turn on the lights"). Power for the TCU is provided by the vehicle's power systems. Many TCUs are programmed periodically to go to full power and initiate a data session in order to send data to the OEM or telematics service providers and to check for commands from the user or another party. Like most wireless communications devices, the control logic for the TCU typically calls for it to terminate any ongoing packet data sessions on the wireless network if no communications have been received after a specified interval and to go to a low-power state when the vehicle ignition is not on or when battery charge level is below a specified level or the vehicle is not connected to another source of continuous power, such as the utility grid. The low power/no active data session state conserves the vehicle's battery and reduces consumption of communications resources. Because the TCU must be adequately powered and a data session must be established in order to respond to a command delivered over a cellular network, there is typically a time lapse between the time the user issues a command (such as "unlock the doors") via an application on a remote device such as a smart phone and the time when a response to that command is produced by the TCU and communicated to the user.

If, when a command from the remote device is received, the TCU is in a low-power state with no active data session, which is typically the case when protocols for the vehicle prioritize minimizing consumption of power and communications resources over rapid execution of user commands, the command cannot be acted upon until the TCU is instructed to establish an active data session, which could include returning to full power mode. The act of starting the control application on the user's remote device (or bringing the application to focus, meaning the application is already running in the background on the remote device but is brought to the foreground, such as by the user touching an icon on the screen so that the user can interact with it) generally acts as such a "shoulder tap" instruction to the TCU.

The shoulder tap is a request to the TCU to initiate a connection with the cellular network, to open a packet data session with the entity that receives the command from the remote device and delivers the command to the TCU and to check for the presence of commands. The entity that receives the commands from the remote device is usually an intermediate server but, in alternate embodiments, could include the remote device or another entity; for convenience, it is referred to as the "remote command server". The method can also contain an instruction to the remote command server to wait for a command to be issued before sending a shoulder tap and instructing the target device to establish an active data session. When a command is issued via the remote device, the TCU will be instructed by the remote command server to establish an active data session if required and to receive and respond to the command, and then to report the results of its execution of the command to the remote command server. The remote command server then reports those results to the user's remote device. The time required to complete this cycle (from issuance by the user of a command to execution of the command and then the user's receipt of confirmation that the command has been executed) can be a lengthy period (up to 30 to 40 seconds), which can result in a negative user experience. If the system has been configured so that the establishment of a data session is delayed until the user has not just started the control application on the remote device, but has actually issued a command, the interval between the issuance and execution of the command is lengthened even further.

Conversely, using device protocols that prioritize minimizing the time lapse between issuance and execution of user commands, such as by keeping the TCU in full power mode and in a continuously active data session, or by establishing active data sessions every time the user initiates an application on the remote device, can cause excessive consumption of cellular resources and of vehicle power. This can result both in a rapid discharge of battery and costs for using cellular resources, which may also result in an unsatisfactory experience for the user. Since many users only initiate the remote device applications for giving commands to target devices a small number of times each day, or often wait a considerable time between initiating the application and actually issuing a command, risking depletion of battery and using cellular resources to keep the target device powered up and in an active data session at all times, or every time the application is initiated or brought to focus, could make users dissatisfied with the application.

A system and method in accordance with the present invention solves the problem of having to choose between prioritizing rapid execution of commands through keeping a target device powered up and in active communication mode, which can result in rapid battery discharge and excessive consumption of communications resources, and prioritizing minimizing the use of those power and communications resources, which can result in an excessive time lapse from the time a user issues a command to a target device to the time the command is acted upon and report of successful execution is delivered to the user. The problem is solved by the application of a set of rules executed through algorithms on the remote command server, remote device or other entity to determine the optimal manner in which to initiate a packet data session.

One embodiment of the present invention includes a method for using consideration of the power profile of the target device to evaluate and apply rules for selecting, from a plurality of possible approaches, an optimal approach for instructing a target device to establish communications in a specific situation. The power profile of the target device shows power resources available to the target device such as but not limited to level of stored power, such as battery charge, ignition status, connection to utility power, etc.

For example, if it is determined at the time a user first starts the relevant control application using a remote device that the target device has an acceptable power profile (e.g., ignition is on, the vehicle is connected to utility power or battery is not discharged below threshold of X %), then the TCU can be instructed, as part of the initial shoulder tap communication, to establish a packet data session with the remote device or server immediately to enable it to respond to any user commands, since there are ample power resources available for the TCU. In an embodiment, establishing a packet data session to enable receipt of user commands may also comprise powering up the target device, such as a TCU.

In the case where it is determined, at the time a user first starts the relevant control application using a remote device, that the target device is in a less desirable power profile (e.g., ignition is off or ignition status is not known or the vehicle is not connected to utility power or connection status is not known and the battery is discharged below a minimum level of Y %), the TCU can be instructed, as part of the initial shoulder tap communication, to wait to establish a packet data session until the user has issued an actual command. In the first case, the time required to execute user commands is minimized, and in the second, the risk of depleting the battery is avoided, thereby improving the user's overall experience. In an embodiment, establishing a packet data session to enable receipt of user commands may also comprise powering up the target device, such as a TCU.

One embodiment of the present invention includes a method for using considerations of user behavior analytics in addition to information about the power profile of the target device to evaluate and apply rules for selecting, from a plurality of possible approaches, an optimal approach for instructing a target device to establish communications in a specific situation.

"User behavior analytics" can be used to predict the likelihood that a user of a particular remote device will issue a particular command to the target device at that particular time or within a given physical proximity. User behavior analytics comprises the analysis of data gathered by an application that monitors behavior of one or more users of a particular remote device to predict the probability of likely user behavior. Data is gathered, for example, about which commands are issued by users of that particular remote device at that particular time of day, on that particular day of the week, at that particular location, or within that particular physical proximity of the target device, in relation to behavior of the user of that remote device in actually issuing that particular command in those circumstances. This determination of the probability that a command will be issued in given circumstances can then be used in combination with information about the power profile of the target device, such as a vehicle, by application of rules or an algorithm to decide how and when an active packet data session should be established.

For example, in the case where it is determined, at the time a user first starts the relevant control application using a remote device, that the target device has an intermediate power profile (e.g., ignition is off or ignition status is not known, or the vehicle is not connected to utility power or connection status is not known and the battery charge level of the vehicle is greater than Y % but less than X %), the method can direct that probability that a given command will be issued, based on analysis of historical behavior of users, be considered in determining the appropriate method for establishing a data session. For example, the remote device or intermediate server can use an algorithm such as: "if true that ignition is off (or ignition status is not known), the vehicle is not connected to utility power or connection status is not known and battery charge level of the vehicle is greater than Y % but less than X % and probability of command from that user (or remote device) is greater than or equal to N, then establish a packet data session immediately upon notification of start-up of application; otherwise, if probability of command from that user (or remote device) is less than N, wait to establish data session until notified that command is actually issued by the user". In an embodiment, establishing a packet data session to initiate communication may also comprise powering up the target device, such as a TCU.

In an embodiment, an appropriate approach can be selected as follows. 1) The method can specify an approach that optimizes for rapid execution of user commands by establishing a packet data session immediately upon notification of start-up of the control application on the remote device when the target device is powered up (e.g., vehicle ignition is on or vehicle is connected to utility power) or when the battery is fully charged (or greater than or equal to charge X %). In this situation, user behavior analytics regarding the probability that the user will promptly issue a command from the remote device will not be considered. In an alternate embodiment, the user behavior analytics can be used to proactively establish a packet data session when ignition is off or ignition status is not known, vehicle is not connected to utility power or connection status is not known and the charge level is greater than X %. 2) The method can specify another approach to be used when the target device is not known to be powered up (e.g., the vehicle ignition is off or ignition status is not known or the vehicle is not connected to utility power or connection status is not known) and the battery is partially discharged but not below a minimum acceptable threshold (e.g., charge level is less than X % but greater than Y %). In this situation, the method specifies use of an approach that achieves a better balance between rapid execution of user commands and effective management of use of power and communications resources by establishing a packet data session immediately upon notification of start-up of the control application on the remote device only when user behavior analytics indicate that the probability that the user will promptly issue a command from the remote device is greater than or equal to N. 3) The method can specify yet another approach to be used when vehicle ignition is off or ignition status is not known, vehicle is not connected to utility power or connection status is not known and battery power is below a certain minimum acceptable threshold charge (e.g., charge level is less than or equal to Y %). This approach optimizes for conserving power by only instructing the target device to establish a packet data session when the user actually issues a command; user behavior analytics regarding the probability that the user will promptly issue a command from the remote device will not be considered. In an embodiment, establishing a packet data session to initiate communication may also comprise powering up the target device, for example a TCU.

In an embodiment, the method and system determines if the power profile of a device matches one of the predetermined profiles and uses the identified power profile as a criterion for whether to consider historical behavior of the user of that device before establishing a connection for communication such as sending and receiving data, for example, user commands. The predetermined profile can be defined for the application, for example in case of a vehicle, in an embodiment, Profile 1: when the power profile of the device suggests that ignition is on or the vehicle is connected to utility power, or battery charge level is above X %. Profile 2: when the power profile of the device suggests that battery charge level is below or equal to X % but above Y %. Profile 3: when the power profile of the device suggests that battery charge level is below or equal to Y %. Since these profiles are defined for the application, the developer can set them as needed.

Similarly, for probability N that the user will promptly issue a command from the remote device is defined for the application and the developer can set it as desired. For example, it may be set as "establish a packet data session immediately upon notification of start-up of the control application on the remote device only when user behavior analytics indicate that the probability that the user will promptly issue a command from the remote device is greater than or equal to N" or simply "greater than N".

To describe the features of the present invention in more detail within the context of the automotive industry, refer to the accompanying figures in conjunction with the following discussions. These examples are used for purpose of illustration only, and should not be construed as limitations.

FIG. 1 illustrates a baseline flow diagram of a system permitting a vehicle user to issue commands to the vehicle from a remote device and using a method for selection of an approach for establishing a data session through rules based on consideration of criteria comprising power profile of the vehicle and analysis of user behavior data in order to balance effective management of use of power and communications resources with rapid execution of user commands. In an embodiment, control logic in a vehicle TCU 101 may instruct it to initiate a data session in order to report to the remote command server for receiving data and executing remote commands 111 via step 106 the power profile of the vehicle either periodically or whenever it changes, such as through change in the ignition status or connection to utility power or whenever its battery charge level has decreased to specified thresholds, such as less than X %). Periodic receipt and storage of the power profile enables the remote command server rapidly to determine the most recent vehicle power profile. A vehicle owner or user uses a smartphone or other remote device 131 to start or bring to focus an application operating on the remote device for issuing commands to the vehicle TCU via step 104. When the application is started or brought to focus, the remote device 131 sends a signal via step 106 to the remote command server 111. The remote command server 111 checks the most recent power profile of the vehicle via step 108.

Depending on the power profile of the vehicle, the remote command server 111 may query an analytics database 121 for the typical behavior of the user using user behavior analytics via step 110. In an embodiment, the typical user behavior can be represented as a probability of a command being issued by that user or remote device in a particular situation. Depending on the probability value received from the analytics database 121, the remote command server 111 sends an instruction to the vehicle TCU 101 by a shoulder-tap to establish a packet data session via step 112. The vehicle TCU 101 starts the packet data session and queries the remote command server 111 for the presence of a user command via step 114. The remote command server 111 holds the query from the vehicle TCU 101 via step 116. If and when the owner or user chooses a command via step 118, the remote command request is sent from the owner smartphone or other remote device 131 to the remote command server 111 and relayed by the remote command server to the vehicle TCU 101 via step 120.

The user command request is then executed by the vehicle TCU 101 via step 122. The results of execution are posted to the remote command server 111 and the presence of another user command is checked by the vehicle TCU 101 via step 124. The results of execution of the command are sent to the owner or user smartphone or other remote device 131 by the remote command server 111 via step 126 and the remote device is updated with the results via step 128. The user behavior analytics database is updated via step 130. A decision is made, based on the power profile of the vehicle and behavior of the user in sending command requests, about whether to keep the connection between the vehicle TCU and the remote command server active; depending on the decision made, either a "keep-alive" command or an instruction to terminate the data session and return to low-power mode is sent by the remote command server 111 to the vehicle TCU 101 via step 132.

In an embodiment, the target device can report on its power profile by periodically reporting on its then-current battery charge level. In yet another embodiment, the power profile can be reported when it changes from one threshold to another, irrespective of pre-set reporting intervals. For example, as the battery charge drops down from Y+1% to Y % or Y % to Y−1% it is reported even if it is not scheduled for reporting. Similarly, when ignition status changes from ignition "off" to ignition "on", or status of connection to utility power changes from "not connected" to "connected", it is reported even if it is not scheduled for reporting.

In an embodiment, the analytics database 121 is enabled to assign a probability that an owner or user will issue a command in specific circumstances by gathering and analyzing data regarding user behavior. For example, if the user typically unlocks the vehicle's door using an application on a smartphone or other remote device between 8:00 and 8:15 a.m. every weekday at a time when the remote device is within X meters of the vehicle, or the user typically uses the remote device application to start the vehicle air conditioning between 5:30 and 6:00 p.m. every weekday, then the analytics database will log this data. The next time that the remote device application is started or brought to focus, the analytics database 121 will calculate a probability that a command will be issued and provide that probability value on request to the remote command server 111 based on such factors as time of day and proximity of the remote device to the vehicle.

For example, the probability value will be higher when the time is closer to 8:00 a.m. or 5:00 p.m. on a weekday and when the remote device is within X meters of the vehicle, and if the remote command server 111, based on the power profile of the vehicle, is to take a probability value into account and the value assigned by the analytics database 121 is greater than N, the remote command server will instruct the vehicle TCU 101 first to establish a packet data session immediately without waiting for a user command and then to keep the connection active for a given period to allow for rapid execution of additional commands, resulting in a material reduction in time delay between issuance by the user of commands and the response to those commands and improved user satisfaction with the vehicle and the remote device control application.

Figure 2:
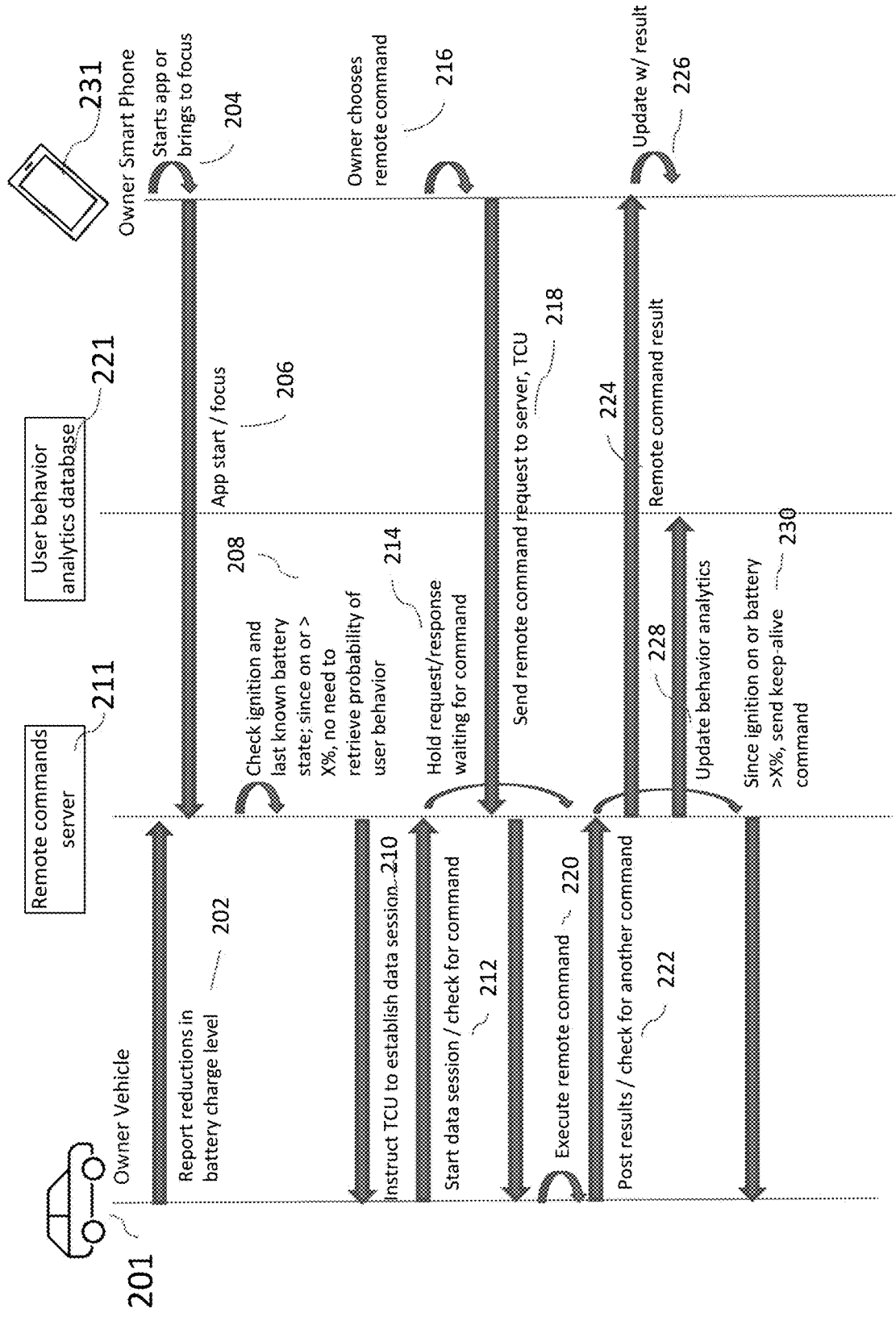
FIG. 2 illustrates optimization of a method for selecting an approach for establishing communications with a target device for rapid execution of user commands when the target device is powered on or when the charge level of the battery of the target device is greater than X % by considering only the power profile of a target device without any consideration of the historical behavior of at least one user.

FIG. 2 illustrates an embodiment of the present invention for a method for selecting an approach for establishing an active data session to optimize for rapid execution of user commands when vehicle ignition is on, the vehicle is connected to utility power or when battery is fully charged (or charge level is greater than charge X %). In this situation, consumption of power and communications resources through maintaining the TCU powered up and in an active communication state to receive and act upon user commands is not as great a concern, and the remote command server can instruct the TCU to establish a packet data session immediately when the user starts or brings to focus an application on a smartphone or other remote device, eliminating delays arising out of the TCU receiving the shoulder tap and then waiting for notification that a command has actually been received before establishing the data session. In another embodiment, the method uses user behavior analytics to proactively establish a packet data session when the power profile shows that ignition is off or ignition status is not known or the vehicle is not connected to utility power or connection status is not known but that battery charge level is greater than X % based on historical user behavior based on time of the day, day of the week, location of the target device and location of the remote device containing the remote application etc.

As shown in FIG. 2, a vehicle owner (or user) starts or brings to focus the control application operating on the remote device 231 for issuing commands to the vehicle TCU 201 via step 204. When the application is started or brought to focus, the remote device 231 sends a signal to the remote command server 211 via step 206 and the remote command server 211 checks the power profile of the vehicle via step 208. Because the power profile of the vehicle is reported as ignition on or the vehicle is connected to utility power or battery charge level greater than or equal to X %, the remote command server will not query the user behavior analytics database 221 for the probability of a command and will send an instruction to the vehicle 201 to establish a packet data session immediately via step 210. Alternatively, user behavior analytics can be used to proactively establish a packet data session when the charge level is greater than or equal to X % based on typical or historical user behavior based on time of the day, day of the week, location of the target device and location of the remote device containing the remote application etc.

The vehicle TCU 201 starts the packet data session and queries the remote command server 211 for the presence of a user command via step 212. The remote command server 211 holds the query from the vehicle TCU 201 via step 214. If and when the user chooses a remote command via step 216, the remote command request is sent from the remote device 231 to the remote command server 211 and relayed by the remote command server to the vehicle TCU 201 via step 218. This user command is then executed by the vehicle TCU 201 via step 220. The results of execution are posted to the remote command server 211 and the presence of another user command is checked by the vehicle TCU 201 via step 222. The results of execution of the user command are sent to the remote device 231 by the remote command server 211 via step 224 and the remote device is updated with the results via step 226. The user behavior analytics database is updated via step 228. Since the power profile of the vehicle is ignition on or the vehicle is connected to utility power or battery charge level greater than or equal to X %, the remote command server 211 will instruct the vehicle TCU 201 to keep the connection between the vehicle TCU and the remote command server active for a given period so that further user commands can be executed immediately.

In an alternate embodiment, the remote command server 211 uses user behavior analytics to instruct the vehicle TCU to maintain the connection between the vehicle TCU and the remote command server for a given period based on the typical user behavior as determined by user behavior analytics database when the power profile is ignition is on, the vehicle is connected to utility power or the battery charge level is greater than or equal to X %. The connection between the vehicle TCU and the remote command server is kept active without regard to user behavior analytics when the ignition is on or the vehicle is connected to utility power since in this state the battery is continuously charging or the charge level is high and such connection would not result in depletion of power resources.

Figure 3:
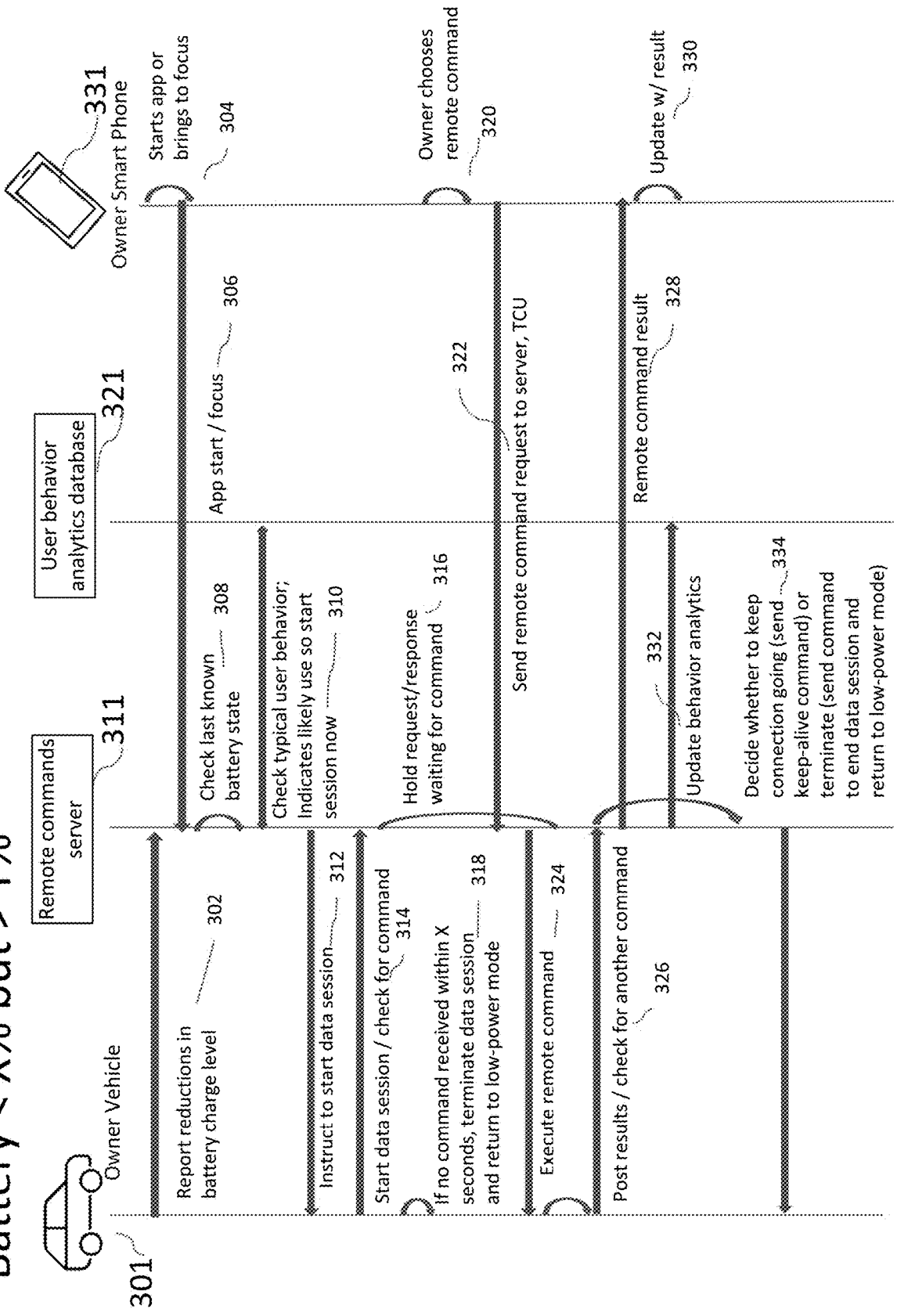
FIG. 3 illustrates adjusting a method for selecting an approach for establishing communications with a target device to achieve an optimal balance between rapid execution of user commands and power management when the target device is not powered on and when the charge level of the battery of the target device is less than X % but greater than Y % by consideration of both power profile of a target device and historical behavior of at least one user.

FIG. 3 illustrates a method for selecting an approach for establishing an active data session when the last known vehicle power profile is vehicle ignition off (or ignition status is not known), the vehicle is not connected to utility power (or connection status is not known) and the battery is partially discharged and below a certain threshold. As battery power goes down to charge less than X % but greater than or equal to Y %, the method will adjust the instructions for establishing packet data sessions by taking into account typical user behavior profile. If, based on user behavior analytics, the probability that the user will issue a command when the application has been started or brought to focus on the remote device is greater than or equal to N, the remote command server can instruct the TCU to establish a packet data session immediately. Any user command would be executed without any delay arising out of the TCU receiving the shoulder tap and then waiting for notification that a command has actually been received before establishing the data session. If the probability is less than N, then the method will prioritize reducing the use of power and communications resources and, when the application on the remote device has been started or brought to focus, instruct the vehicle TCU to wait for issuance of a command before establishing a packet data session.

As shown in FIG. 3, a vehicle owner (or user) starts or brings to focus an application operating on the remote device 331 for issuing commands to the vehicle TCU via step 304. When the application is started or brought to focus, the remote device 331 sends a signal to the remote command server 311 via step 306 and the remote command server 311 checks the power profile of the vehicle via step 308. Because the power profile of the vehicle is reported as ignition off (or ignition status not known), the vehicle is not connected to utility power (or connection status is not known) and battery charge level less than X % but greater than or equal to Y %, then the remote command server 311 queries the analytics database 321 for the probability of a command via step 310. If the probability value received is less than N, then the remote command server 311 will wait for issuance of an actual command before instructing the vehicle TCU to establish a packet data session. But if the probability value received from the analytics database 321 is greater than or equal to N, the remote command server 311 will send an instruction to the vehicle TCU 301 to establish a packet data session immediately via step 312. The vehicle TCU 301 starts the packet data session and queries the remote command server 311 for the presence of a user command via step 314.

The remote command server 311 holds the query from the vehicle TCU 301 via step 316. If a command is not received within X seconds, the remote command server 311 will instruct the vehicle TCU 301 to terminate the data session and return to low-power mode via step 316 and the process will return to initial state. If, however, the user chooses a command within that period via step 320, the command request is sent from the smartphone or other remote device 331 to the remote command server 311 and relayed by the remote command server 311 to the vehicle TCU 301 via step 322. This user command is then executed by the vehicle TCU 301 via step 324. The results of execution are posted to the remote command server 311 and the presence of another user command is checked by the vehicle TCU 301 via step 326. The results of execution of the command are sent to the remote device 331 by the remote command server 311 via step 328 and the remote device is updated with the results via step 330. The user behavior analytics database is updated via step 332.

A decision is then made, based on the power profile of the vehicle and user behavior in sending command requests, about whether to keep the connection between the vehicle TCU 301 and the remote command server 311 active; depending on the decision made, either a "keep-alive" command or an instruction to terminate the connection and return to low-power mode is sent by the remote command server 311 to the vehicle TCU 301 via step 334.

Figure 4:
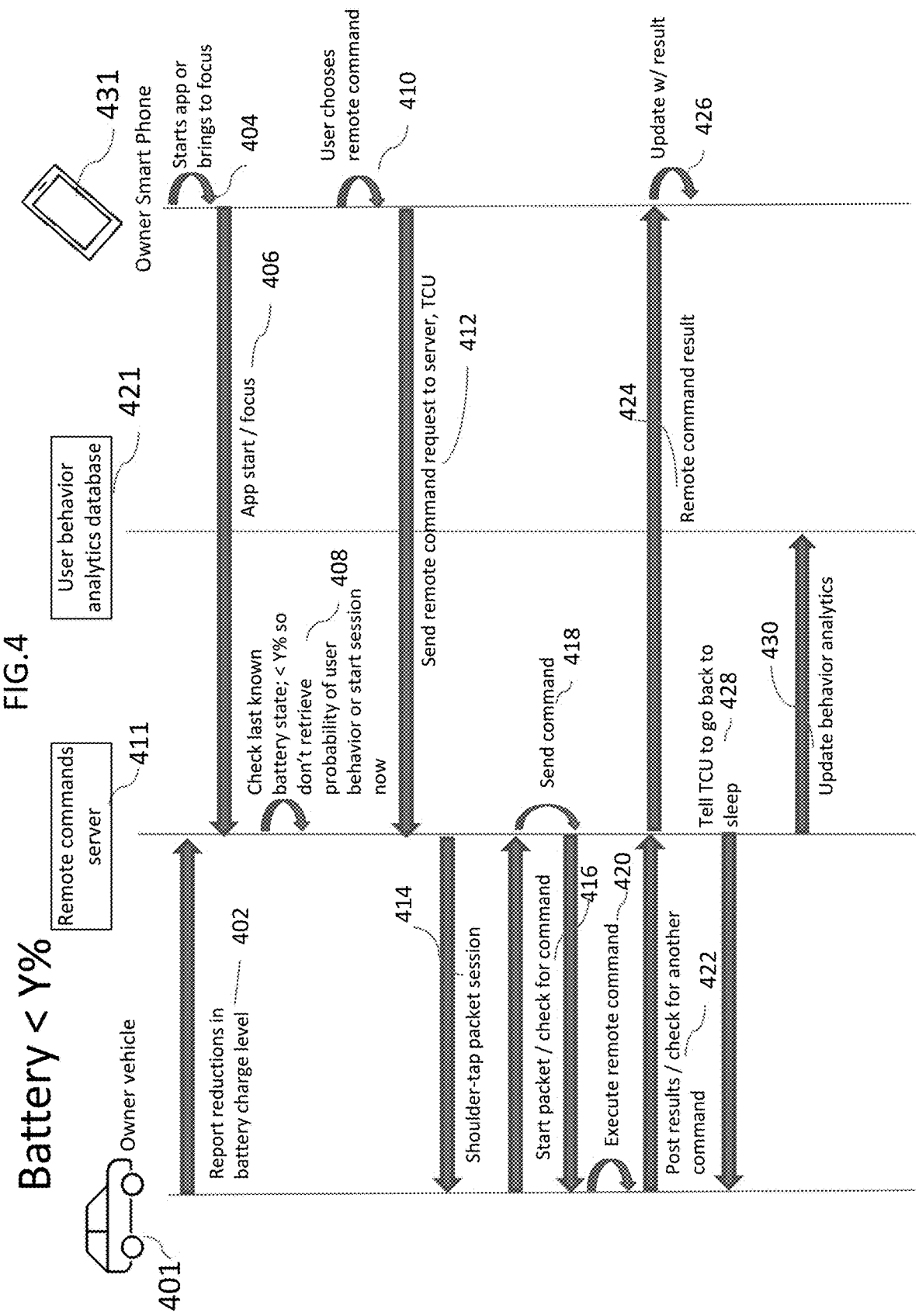
FIG. 4 illustrates adjusting a method for selecting an optimal approach for establishing communications with a target device to adjust protocol for execution of user commands in order to optimize power management when the target device is not powered on and the charge level of the battery of the target device is less than Y % by considering only the power profile of a target device without any consideration of the historical behavior of at least one user.

FIG. 4 illustrates a method for selecting an approach for establishing an active data session as battery power is reduced below a certain threshold charge. For example, if ignition is off (or ignition status is not known), the vehicle is not connected to utility power (or connection status is not known) and the charge is less than Y %, consumption of power and communications resources through maintaining the TCU in an active power and communication state to receive and act upon user commands is a concern, and accordingly the remote command server will wait to instruct the TCU to establish a packet data session only when a command is actually issued by the user without any consideration to typical user behavior. Once a command is issued and executed, the TCU will be kept in full power mode and the data session will be kept connected for a very short period of time waiting for additional commands. While there will be a resulting delay in execution of user commands as the TCU is not connected to the remote command server until a user command has actually been received and the instruction to establishment a data session has been sent to the TCU, the user would possibly be even less satisfied if optimizing for rapid execution of commands resulted in the battery being discharged below the level needed for ignition.

As shown in FIG. 4, a vehicle owner (or user) starts or brings to focus an application operating on the remote device 431 for issuing commands to the vehicle TCU 401 via step 404. When the application is started or brought to focus, the remote device 431 sends a signal to the remote command server 411 via step 406 and the remote command server 411 checks the last known power profile of the vehicle stored in the remote command server via step 408. Because the power profile of the vehicle is reported as battery charge level less than Y % and ignition status is either not known or is off and the vehicle is either not connected to utility power or connection status is not known, the remote command server will not query the analytics database 421 for the probability of a command and will wait to send a shoulder-tap to the vehicle TCU 401 until the user actually chooses a command. Once the user chooses a command, the remote command request is sent from the smartphone or other remote device 431 to the remote command server 411 via step 414.

The remote command server 411 sends a shoulder-tap to the vehicle TCU 401 instructing it to establish a packet data session via step 414. The vehicle TCU 401 starts the packet data session and queries the remote command server for the presence of a user command via step 416; the remote command server relays the command to the vehicle TCU via step 418. This user command is then executed by the vehicle TCU 401 via step 420. The results of execution are posted to the remote command server 411 and the presence of another user command is checked by the vehicle TCU 401 via step 422. The results of execution of the remote command are sent to the remote device 431 by the remote command server 411 via step 424 and the remote device is updated with the results via step 426. Since the power profile of the vehicle is battery charge level less than Y %, the remote command server 411 will not wait for an additional user command, but will instead immediately instruct the vehicle TCU 401 to terminate the packet data session and connection between the vehicle TCU and the remote command server and to return to low-power mode in order to conserve battery and communications resources via step 428. The user behavior analytics database is updated via step 430.

The embodiments described above illustrate the use of remote command server to establish connection and/or the use of remote command server to instruct the TCU of the target device to establish connection based on power profile of the target device and/or historical user behavior. Additionally, or alternatively, in one or more embodiments described as follows, by programming the IoT device with baseline schedule of instructions and then having the system learn the heuristics based on system behavior, communication behavior, and user behavior over time to adjust the IoT device power profile and schedule, the TCU/ECU itself may decide whether to establish communications based on power profile of the target device and/or historical user behavior.

Although the various embodiments described herein use vehicle as an example of IoT device, a person skilled in the art may readily understand that the method, system and computer program product described herein may also be used by other IoT devices, for example, mobile phones, smart watches, loan mowers, boats, e-bikes, drones, smart meters, etc., and is within the scope and spirit of this invention.

Thus, in one or more embodiment, a computer-implemented method, system and computer program product for optimizing user experience are disclosed. The method includes determining power profile of a target device; determining historical behavior of at least one user in relation to the target device; considering the historical behavioral data of the at least one user in relation to the target device based on the determined power profile of the target device; and using rules to select at least one of a plurality of approaches for establishing connection with the server in relation to a result of the considering.

The system for optimizing user experience and power management comprising a target device, a database and a server, the server including a processor, a memory in communication with the processor, wherein the server determines historical behavior of at least one user based on a set of parameters related to the target device; and wherein the target device determines a power profile of the target device, considers historical behavioral data of the at least one user based on the determined power profile; and uses rules to select at least one of a plurality of approaches for establishing connection with the server in relation to a result of the considering.

The non-transitory computer-readable medium having executable instructions stored therein that, when executed, cause one or more processors corresponding to a system having a target device, a database and a server, the server including a processor, a memory in communication with the processor, to perform operations comprising: determining historical behavior of at least one user; determining a power profile of the target device; considering historical behavioral data of the at least one user based on the determined power profile of the target device; and using rules to select at least one of a plurality of approaches for establishing connection with the server in relation to a result of the considering.

In one or more embodiments, the method, system and computer program product further include powering up one or more components of the target device.

Figure 5:
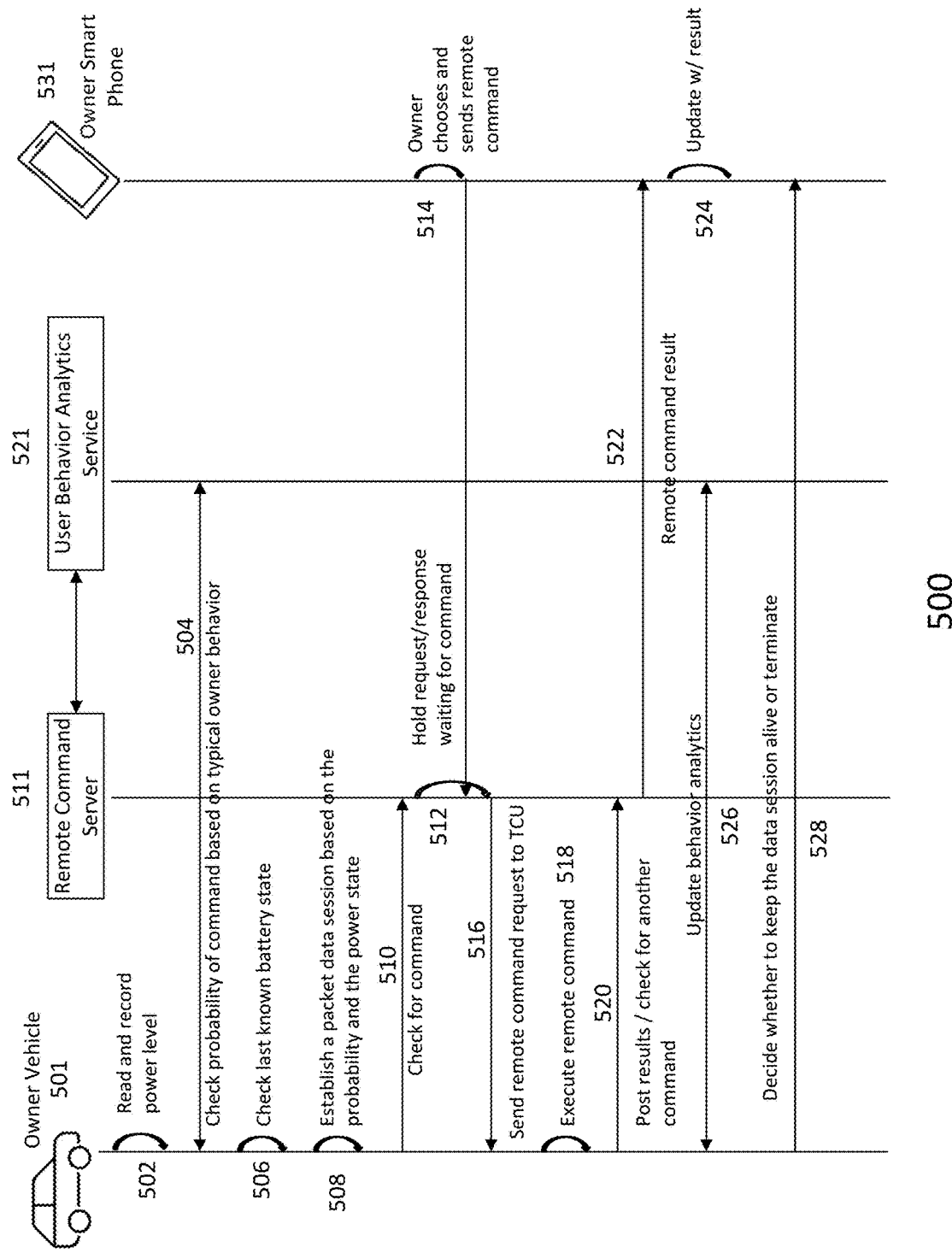
FIG. 5 illustrates a baseline flow diagram of a method for selecting an approach for establishing communications to enable execution of commands from a user according to one or more embodiments of the present invention.

FIG. 5 illustrates a baseline flow diagram of a method 500 for selecting an approach for establishing communications to enable execution of commands from a user with possible consideration of either or both of the power profile of a target device and the historical behavior of at least one user according to one or more embodiments of the present invention.

In an embodiment, control logic in a vehicle TCU/ECU 501 may instruct it to read and store the power profile of the vehicle either periodically or whenever it changes, such as change in the ignition status or connection to utility power or whenever its battery charge level has decreased to specified thresholds, such as less than X % via step 502. Such storage of the power profile enables the TCU/ECU to rapidly determine the most recent vehicle power profile.

Based on the default schedule provided in the beginning, or based on the learned user behavior when the probability of user using certain functions, the vehicle TCU/ECU 501 may query a user behavior analytics service 521 for the typical behavior of the user using user behavior analytics via step 504. The vehicle TCU/ECU 501 may add to the query information that was captured in step 502.

The vehicle TCU/ECU 501 may check the most recent power profile of the vehicle, for example, battery reading, via step 506. This step may be performed periodically, based on the default schedule provided in the beginning, or based on the learned user behavior when the probability of user using certain functions.

The user behavior analytics service 521 may include a database or a database with some computing power and/or a server and may work in concert with the remote command server 511. In an embodiment, the remote command server 511 may be part of user behavior analytics service 521 or separate from user behavior analytics service 521.

In an embodiment, the typical user behavior may be represented as a probability of a command being issued by that user or remote device in a particular situation. Depending on the power profile of the device, and the probability value received from the analytics database 521, the vehicle TCU/ECU 501 may initiate a packet data session via step 508. The vehicle TCU 501 starts the packet data session and enters a state where it is capable of receiving user-initiated and/or backend or remote command server-initiated commands from the remote command server 511 via step 510. The remote command server 511, once realizing that the vehicle TCU 501 is ready to accept commands, enters a state of ability to receive commands from the user, and/or other backend services, towards vehicle TCU 501 via step 512. If and when the owner or user chooses a command via step

514, the remote command request is sent from the owner smartphone or other remote device 531 to the remote command server 511 and relayed by the remote command server to the vehicle TCU 501 via step 516. The backend may include one or more servers in addition to remote command server 511 and user behavior analytics service 521.

The user command request is then executed by the vehicle TCU 501 via step 518. The results of execution are posted to the remote command server 511 and the presence of another user command is checked by the vehicle TCU 501 via step 520. The results of execution of the command are sent to the owner or user smartphone or other remote device 531 by the remote command server 511 via step 522 and the remote device is updated with the results which may then be presented to the end-user via step 524. The user behavior analytics database is updated via step 526. A decision is made by the vehicle TCU 501 via step 528, based on the power profile of the vehicle and behavior of the user in sending command requests, about whether to keep the connection between the vehicle TCU and the remote command server active; depending on the decision made, the vehicle may remain at the same power state as before executing the command depending on the power used during the process or change to a different power state, that may result in, for example, either keep the connection alive or to terminate the data session and return to lower-power mode.

In an embodiment, the target device can read and save its power profile by periodically rereading its then-current battery charge level. In yet another embodiment, the power profile can be read when it changes from one threshold to another, irrespective of pre-set reading intervals. For example, as the battery charge drops down from Y+X % to Y % or Y % to Y−Z % it is read and saved periodically—with frequency determined by the power states. As an example, a higher power state, for example, active and reduced, may allow a higher frequency polling, and a low power state, for example, standby, hibernate, shutdown, etc., may allow less frequent polling to preserve battery. The update of power levels/profiles may be also event trigger based for special events. For example, when ignition status changes from ignition "off" to ignition "on", or status of connection to utility power changes from "not connected" to "connected", it may be read and saved even if it is not scheduled for reading at the time of change. Although, the power states are used here as an example to illustrate determination frequency of polling, other parameters such as probability of user using the device and/or connection to power, etc. may also determine the frequency of polling. For example, even if the vehicle is in lower power state, if the probability of user using the device is high, then the frequency of polling may be high, as determined by the configuration. As an example, one of the ways to perform periodic polling may use a special low power circuitry connected to battery to read the battery charge.

In an embodiment, the analytics service 521 is enabled to assign a probability that an owner or user will issue a command in specific circumstances by gathering and analyzing data regarding user behavior. For example, if the user typically unlocks the vehicle's door using an application on a smartphone or other remote device between 8:00 and 8:15 a.m. every weekday at a time when the remote device is within X meters of the vehicle, or the user typically uses the remote device application to start the vehicle air conditioning between 5:30 and 6:00 p.m. every weekday, then the analytics service will log this data. The next time that the remote device application is started or brought to focus, the analytics service 521 will calculate a probability that a command will be issued and provide that probability value on request to the remote command server 511 based on such factors as time of day and proximity of the remote device to the vehicle.

For example, the probability value will be higher when the time is closer to 8:00 a.m. or 5:00 p.m. on a weekday and when the remote device is within X meters of the vehicle, and if the vehicle TCU/ECU 501, based on the power profile of the vehicle, is to take a probability value into account and the value assigned by the analytics service 521 is greater than N, the vehicle TCU 501 will first establish a packet data session immediately without waiting for a user command and then to keep the connection active for a given period to allow for rapid execution of additional commands, resulting in a material reduction in time delay between issuance by the user of commands and the response to those commands and improved user satisfaction with the vehicle and the remote device control application.

Figure 6:
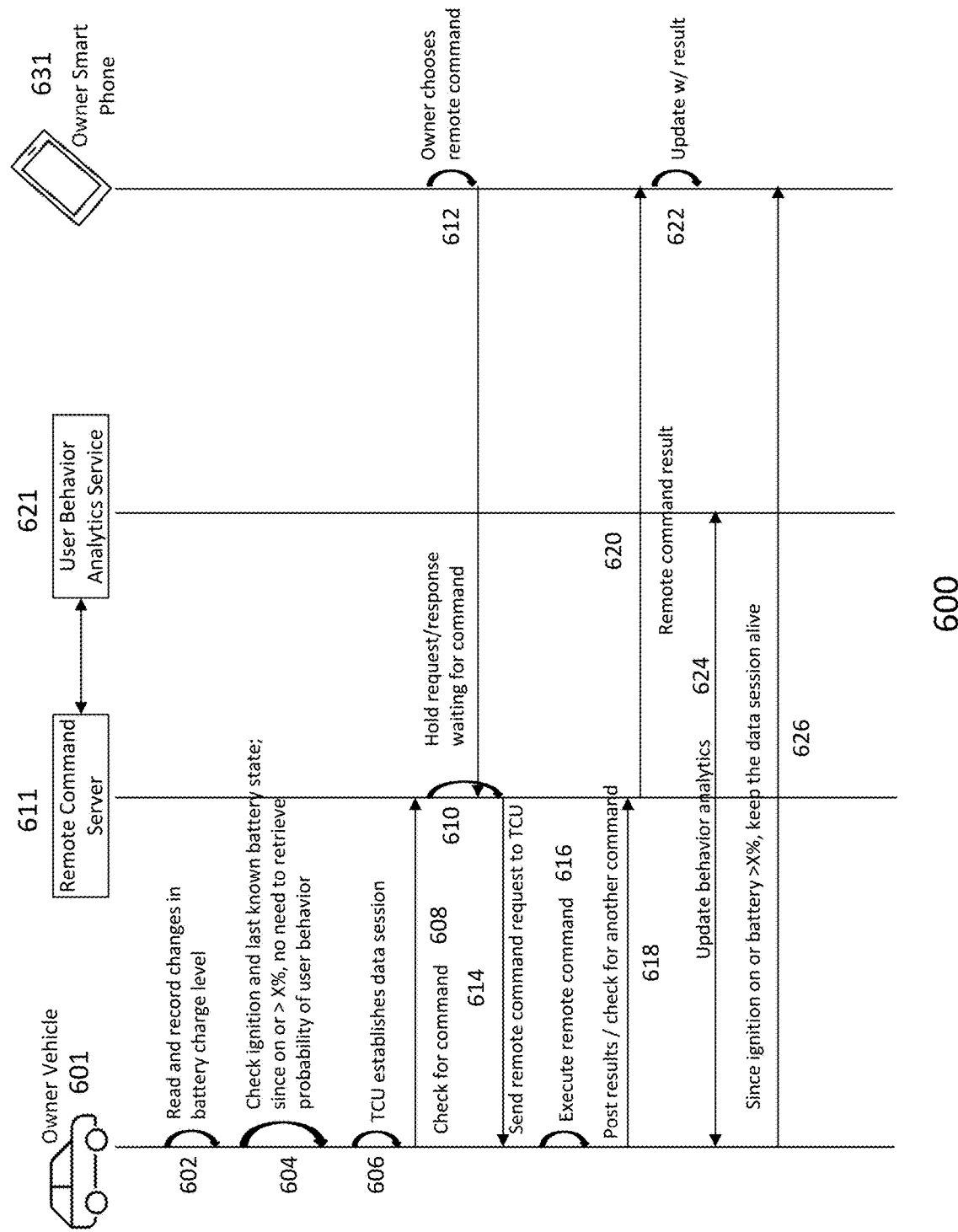
FIG. 6 illustrates a flow diagram for optimization of a method for selecting an approach for establishing communications to enable execution of user commands according to one or more embodiments of the present invention.

FIG. 6 illustrates optimization of a method 600 for selecting an approach for establishing communications for rapid execution of user commands when the target device is powered on or when the charge level of the battery of the target device is greater than X % by considering only the power profile of a target device without any consideration of the historical behavior of at least one user according to one or more embodiments of the present invention.

In an embodiment of the present invention for a method for selecting an approach for establishing an active data session to optimize for rapid execution of user commands when vehicle ignition is on, the vehicle is connected to utility power or when battery is fully charged (or charge level is greater than charge X %). In this situation, consumption of power and communications resources through maintaining the TCU powered up and in an active communication state to receive and act upon user commands is not as great a concern, and the TCU may establish a packet data session immediately when the user starts or brings to focus an application on a smartphone or other remote device, eliminating delays arising out of the TCU receiving the shoulder tap and then waiting for notification that a command has actually been received before establishing the data session. In another embodiment, the method uses user behavior analytics to proactively establish a packet data session when the power profile shows that ignition is off or ignition status is not known or the vehicle is not connected to utility power or connection status is not known but that battery charge level is greater than X % based on historical user behavior based on one or more of: location of the target device, location of a remote device containing the remote application, proximity of the remote device to the target device, time of the day, day of the week, a type of command issued, holiday schedule, outside temperature etc.

As shown in FIG. 6, a vehicle TCU 601 may check the ignition and/or the last known battery level via step 604. Because the power profile of the vehicle is recorded as ignition on or the vehicle is connected to utility power or battery charge level greater than or equal to X % per step 602, the vehicle TCU 601 will not query the user behavior analytics service 621 for the probability of a command and the vehicle 601 may establish a packet data session immediately in response to step 604 via step 606. Alternatively, user behavior analytics can be used by the vehicle TCU 601 to proactively establish a packet data session when the charge level is greater than or equal to X % based on typical or historical user behavior based on one or more of: location of the target device, location of a remote device containing the remote application, proximity of the remote device to the target device, time of the day, day of the week, a type of command issued, holiday schedule, outside temperature etc.

The vehicle TCU 601 starts the packet data session and enters a state where it is capable of receiving user-initiated and/or backend or remote command server-initiated commands via step 606 and checks for remote commands from server 611 via step 608. The remote command server 611, once realizing that the vehicle TCU 501 is ready to accept commands, enters a state of ability to also receive real-time commands from the user, and/or other backend services, towards vehicle TCU 601 via step 610. If and when the user chooses a remote command via step 612, the remote command request is sent from the remote device 631 to the remote command server 611 and relayed by the remote command server to the vehicle TCU 601 via step 614. This user command is then executed by the vehicle TCU 601 via step 616. The results of execution are posted to the remote command server 611 and the presence of another user command is checked by the vehicle TCU 601 via step 618. The results of execution of the user command are sent to the remote device 631 by the remote command server 611 via step 620 and the remote device is updated with the results which may then be presented to the end-user via step 622. The user behavior analytics database is updated via step 624. Since the power profile of the vehicle is ignition on or the vehicle is connected to utility power or battery charge level greater than or equal to X %, the vehicle TCU 601 to keep the connection between the vehicle TCU and the remote command server active for a given period via step 626 so that further user commands can be executed immediately. The vehicle may remain at the same power state as before executing the command depending on the power used during the process or change to a different power state, that may result in, for example, either a "no change of state" realization, for example, in this case keep the data session alive or a decision to terminate the data session and switch to lower-power state depending on the power profile of the vehicle at that point.

In an alternate embodiment, the vehicle TCU 601 may use the user behavior analytics to maintain the connection between the vehicle TCU 601 and the remote command server 611 for a given period based on power level and the typical user behavior as determined by user behavior analytics service 621 when the power profile is ignition is on, the vehicle is connected to utility power, or the battery charge level is greater than or equal to X %. The connection between the vehicle TCU 601 and the remote command server 611 is kept active without regard to user behavior analytics when the ignition is on, or the vehicle is connected to utility power since at this power profile the battery is continuously charging, or the charge level is high and such connection would not result in depletion of power resources.

Figure 7:
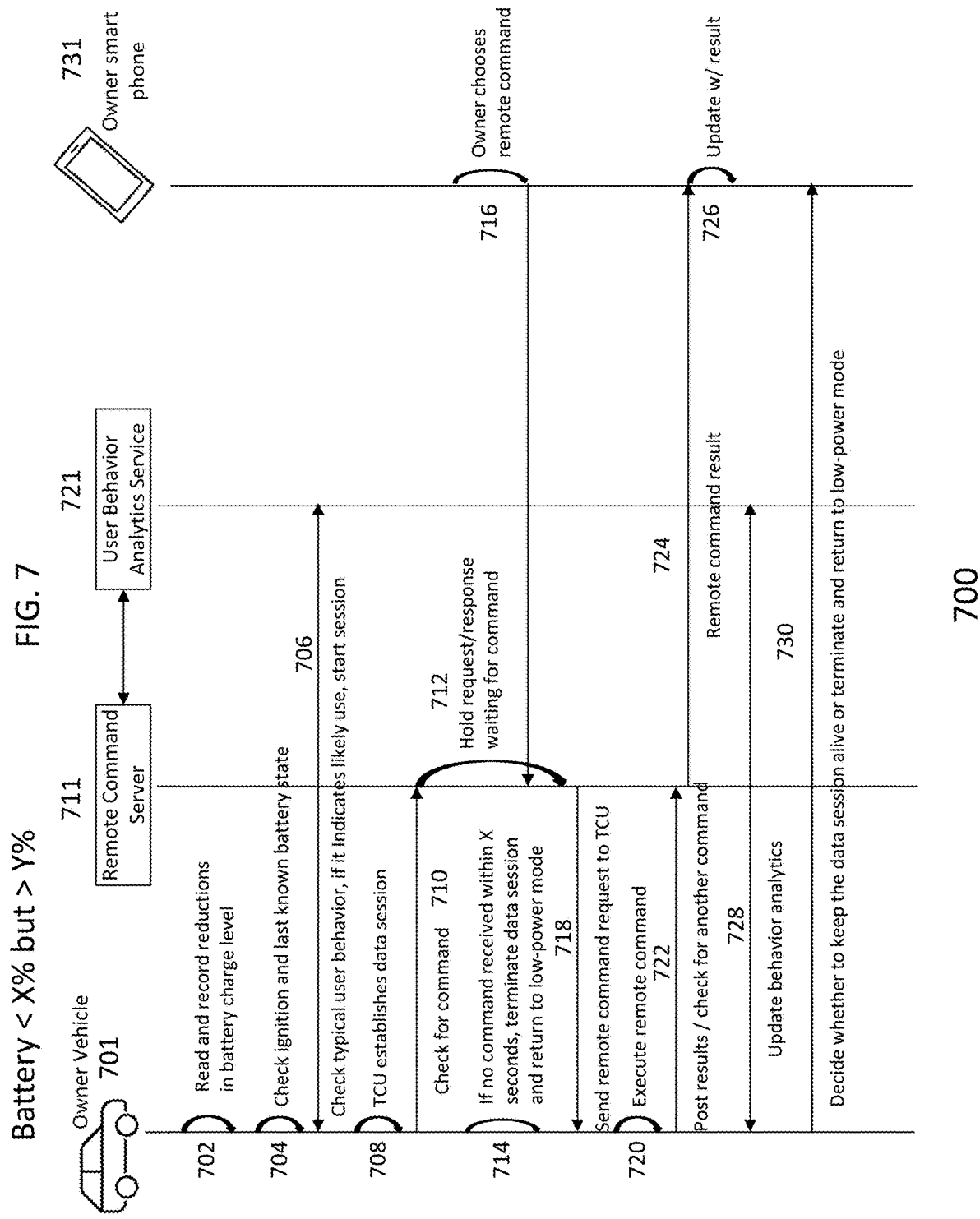
FIG. 7 illustrates a flow diagram for optimization of a method for selecting an approach for establishing communications to achieve an optimal balance between rapid execution of user commands and power management according to one or more embodiments of the present invention.

FIG. 7 illustrates adjusting a method 700 for selecting an approach for establishing communications to achieve an optimal balance between rapid execution of user commands and power management when the target device is not powered on and when the charge level of the battery of the target device is less than X % but greater than Y % by consideration of both power profile of a target device and historical behavior of at least one user according to one or more embodiments of the present invention.

For example, when the last known vehicle power profile is vehicle ignition off (or ignition status is not known), the vehicle is not connected to utility power (or connection status is not known) and the battery is partially discharged and below a certain threshold. As battery power goes down to charge less than X % but greater than or equal to Y %, the method will adjust the instructions for establishing packet data sessions by taking into account typical or historical user behavior based on one or more of: location of the target device, location of a remote device containing the remote application, proximity of the remote device to the target device, time of the day, day of the week, a type of command issued, holiday schedule, outside temperature, etc. If, based on user behavior analytics, the probability that the user will issue a command is greater than or equal to N, the vehicle TCU may establish a packet data session immediately. Any user command would be executed without any delay arising out of the TCU receiving the shoulder tap and then waiting for notification that a command has actually been received before establishing the data session. If the probability is less than N, then the method will prioritize reducing the use of power and communications resources and, this may mean to periodically wake up and check for activity or for new backend/remote server guidance to the vehicle power state.

As shown in FIG. 7, in an embodiment, control logic in a vehicle TCU/ECU 701 may instruct it to read and store the power profile, for example, power level, of the vehicle either periodically or when some triggers occur, such as change in the ignition status or connection to utility power or whenever its battery charge level has decreased to specified thresholds, such as less than X % via step 702. Such storage of the power profile enables the TCU/ECU to determine the most recent vehicle power profile, for example, power level and/or events such as ignition on/off.

Based on confirmation of the power level not too low (charge larger than Y) but not very high (charge smaller than X) and no ignition or outlet power connection, the vehicle TCU/ECU 701 may decide to query a user behavior analytics service 721 for the typical behavior of the user using user behavior analytics via step 704. This step may be performed periodically, based on the default schedule provided in the beginning, or based on the learned user behavior when the probability of user using certain functions. Because one of the power events of the vehicle is reported as ignition off (or ignition status not known), the vehicle is not connected to utility power (or connection status is not known) and battery charge level less than X % but greater than or equal to Y %, then the vehicle TCU 701 queries the user analytics service 721 for the probability of a command via step 706.

The vehicle TCU/ECU 701 may then check the probability that the user will issue a command via step 706. If the probability value received is less than N, then the vehicle TCU 701 will wait for issuance of an actual command before establishing a packet data session. But if the probability value received from the user analytics service 721 is greater than or equal to N, the vehicle TCU 701 will establish a packet data session immediately via step 708. Thus, depending on the power profile of the vehicle 701, and the probability value received from the analytics database 721, the vehicle 701 may initiate a packet data session via step 708. The vehicle TCU 701 starts the packet data session and enters a state where it is capable of receiving user-initiated and/or backend or remote server-initiated commands from the remote command server 711 for the presence of a user command via step 710.

The remote command server 711, once realizing that the vehicle TCU 701 is ready to accept commands, enters a state of ability to receive commands from the user, and/or other backend services, towards vehicle TCU 701 via step 712. If a command is not received within X seconds, the vehicle TCU 701 may terminate the data session and return to low-power mode via step 714 and the process will return to initial state. If, however, the user chooses a command within that period via step 716, the command request is sent from the smartphone or other remote device 731 to the remote command server 711 and relayed by the remote command server 711 to the vehicle TCU 701 via step 718. This user command is then executed by the vehicle TCU 701 via step 720. The results of execution are posted to the remote command server 711 and the presence of another user command is checked by the vehicle TCU 701 via step 722. The results of execution of the command are sent to the remote device 731 by the remote command server 711 via step 724 and the remote device is updated with the results which may then be presented to the end-user via step 726. The user behavior analytics database is updated via step 728.

A decision is then made, based on the power profile of the vehicle and user behavior in sending command requests, about whether to keep the connection between the vehicle TCU 701 and the remote command server 711 active; depending on the decision made, the vehicle TCU 701 either keeps the connection alive or terminates the connection and returns to low-power mode via step 730. The vehicle may remain at the same power state as before executing the command depending on the power used during the process or change to a different power state, that may result in, for example, either a "no change of state" realization, for example, in this case keep the data session alive to terminate the data session and switch to lower-power state depending on the power profile of the vehicle at that point.

Figure 8:
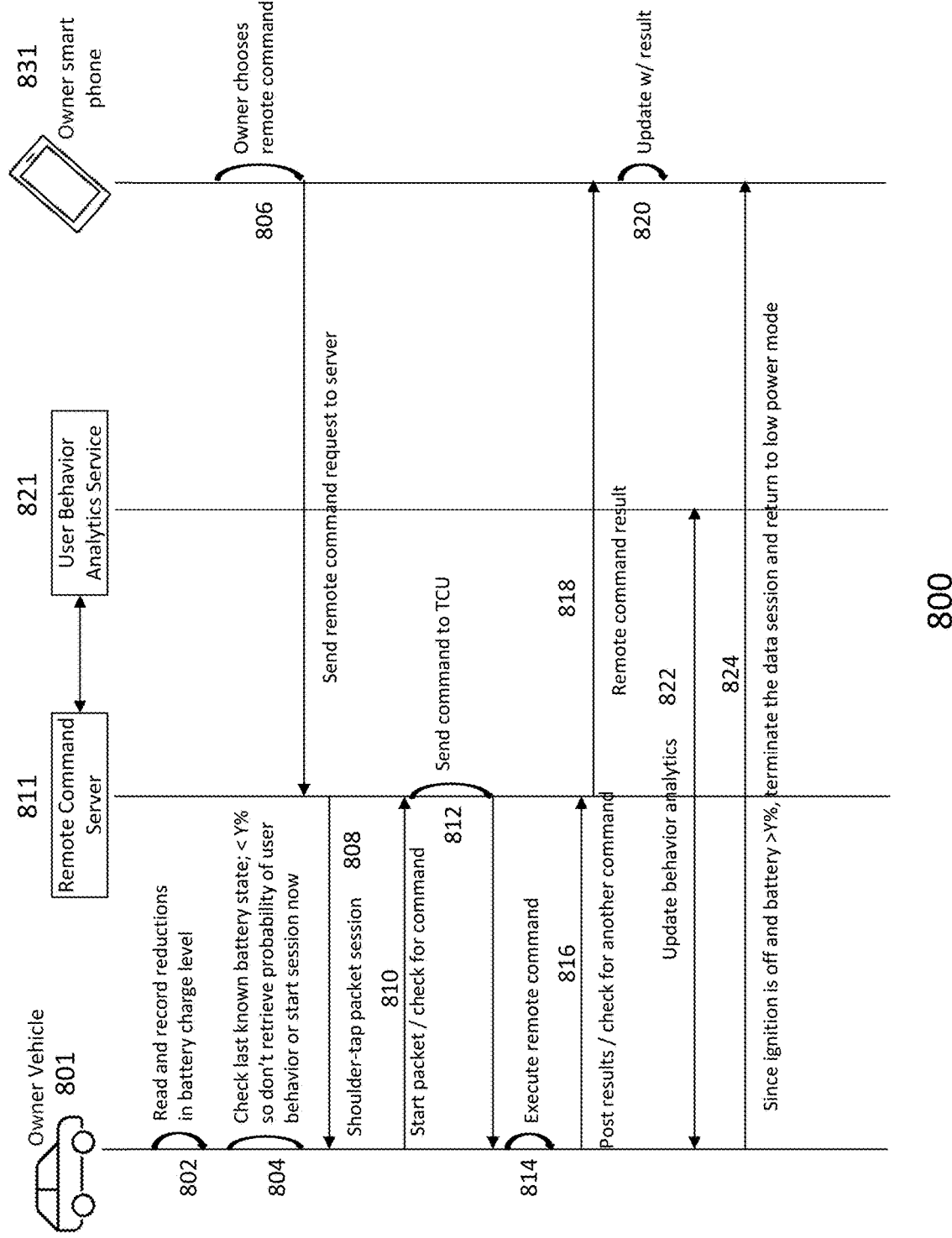
FIG. 8 illustrates a flow diagram for optimization of a method for selecting an approach for establishing communications and adjust protocol for execution of user commands in order to optimize power management according to one or more embodiments of the present invention.

FIG. 8 illustrates adjusting a method 800 for selecting an optimal approach for establishing communications adjust protocol for execution of user commands in order to optimize power management when the target device is not powered on and the charge level of the battery of the target device is less than Y % by considering only the power profile of a target device without any consideration of the historical behavior of at least one user according to one or more embodiments of the present invention.

For example, a method for selecting an approach for establishing an active data session as battery power is reduced below a certain threshold charge. For example, if ignition is off (or ignition status is not known), the vehicle is not connected to utility power (or connection status is not known) and the charge is less than Y %, consumption of power and communications resources through maintaining the TCU in an active power and communication state to receive and act upon user commands is a concern, and accordingly the vehicle TCU will wait to establish a packet data session only when a command is actually issued by the user without any consideration to typical user behavior. Once a command is issued and executed, the TCU will be kept in full power mode and the data session will be kept connected for a very short period of time waiting for additional commands. While there will be a resulting delay in execution of user commands as the TCU is not connected to the remote command server until a user command has actually been received and the instruction to establishment a data session has been sent to the TCU, the user would possibly be even less satisfied if optimizing for rapid execution of commands resulted in the battery being discharged below the level needed for ignition.

As shown in FIG. 8, In an embodiment, control logic in a vehicle TCU/ECU 801 may instruct it to read and store the power profile of the vehicle either periodically or whenever it changes, such as change in the ignition status or connection to utility power or whenever its battery charge level has decreased to specified threshold values, such as a value less than X % via step 802. Such storage of the power profile enables the TCU/ECU to determine the most recent vehicle power profile.

The vehicle TCU/ECU 801 may check the most recent power profile, for example, charge values and may determine that it is not charging and the level is lower than Y % via step 804. This step may be performed periodically, based on the default schedule provided in the beginning, or based on the learned user behavior when the probability of user using certain functions.

Because the power profile of the vehicle is reported as battery charge level less than Y % and ignition status is either not known or is off and the vehicle is either not connected to utility power or connection status is not known, the vehicle TCU/ECU 801 will not query the analytics service 821 for the probability of a command. The remote command server 811 will wait to send a shoulder-tap to the vehicle TCU 801 until the user actually chooses a command. Once the user chooses a command, the remote command request is sent from the smartphone or other remote device 831 to the remote command server 811 via step 806.

The remote command server 811 sends a shoulder-tap to the vehicle TCU 801 to establish a packet data session via step 808. The vehicle TCU 801 starts the packet data session and queries the remote command server for the presence of a user command via step 810; the remote command server relays the command to the vehicle TCU via step 812. This user command is then executed by the vehicle TCU 801 via step 814. The results of execution are posted to the remote command server 811 and the presence of another user command is checked by the vehicle TCU 801 via step 816. The results of execution of the remote command are sent to the remote device 831 by the remote command server 811 via step 818 and the remote device and/or end-user user/services are updated with the results via step 820. The User Behavior Analytics Services 821 is then updated via step 822. Since the power profile of the vehicle is battery charge level less than Y %, the vehicle TCU 801 will not wait for an additional user command but will instead immediately terminate the packet data session and connection between the vehicle TCU and the remote command server and to return to low-power mode in order to conserve battery and communications resources via step 824.

The embodiments described above provide one or more options for selecting a suitable approach for when to wake up the device, when to instruct the device to go to full power model, when to instruct the device to initiate a packet session, when to instruct the device to terminate the data session, and when to instruct the device to go to a lower power state. These approaches are based on the current power profile (fully charged, plugged in or not, medium charge, low charge) of the IoT device, also referred to as a target device or a receiving device, and the historical behavior of the user, also referred to herein as user behavior analytics for that device.

The method, system and computer program product described herein allows a vehicle's computer to learn the vehicle user's behavior and use the learned user behavior for optimizing the use of power to do its necessary tasks, as well as to optimize user experience, thus programming power usage is a completely computerized action. The vehicle can also leverage the parameters of a model that is computed in the backend and only invoke the necessary actions based on need. As an example, the time between waking up and verifying the vehicle power profile and the need to change the vehicle power state, can be a result of a calculation involving a large set of data by the behavior analytics server.

The calculation involving a large set of data by the behavior analytics server may include user behavior for one user and/or plurality of users where although the results of the analysis may be used by the analytics server to calculate probability of specific user behavior, the actual user data for the users other than the user of the vehicle may not be made available to the user of the vehicle protecting privacy of other individual users whose data was used for calculating probability.

Additionally, once a default schedule is downloaded or provided to a whole fleet of vehicles, those vehicles would then be able to adjust to the schedules and behaviors of their individual drivers. Although the embodiments described herein use "vehicle user" as one person, a person skilled in the art may readily understand that such learning can be applied to more than one users, for example, in case of a car, driver 1, driver 2, driver 3 . . . etc. and the learned user behavior may be used as separate user behavior profile for each user or driver or cumulative user behavior learned for all drivers but used for individual users/drivers in certain situations as applicable, and is also within the spirit and scope of the present invention.

In an embodiment, managing and optimizing power usage in IoT devices such as connected vehicles by programming the IoT device with a baseline schedule of instructions and then having the IoT device, and/or the backend learn the heuristics based on user and/or device behavior, communication behavior, and user behavior over time to adjust the IoT device power profile and schedule.

Assuming that an IoT device, for example a vehicle, is to perform certain operations when it is not in use or being driven, the vehicle may be programmed with a schedule for powering up the vehicle, doing required operations, and powering down. More specifically, the schedule may define the specific power state the vehicle, for example, car, is in before the operations are performed and the specific power state the vehicle should go to after. This concept may also be applied to have the vehicle power up and use multiple CPUs to do a variety of computing tasks.

A vehicle may be provided with a default power management and connection management profile/schedule, defining when power is needed. Additionally, the vehicle may be provided with user-customizable power management and connection management profile/schedule, defining when power is needed. For example, between hours A and B, the vehicle may be in full power mode, connected to the network, then afterward, it may drop to low power mode. Similarly, between hours C and D, the vehicle may be completely disconnected from the network and stay in low power mode and between hours E and F, the vehicle may be completely shut down, etc. Such schedule may be useful for devices such as but not limited to an electric car.

The vehicle may then adjust the downloaded power and connection schedule based on heuristics, which may be programmed to look for user behavior patterns and the actions to take when those patterns are encountered.

As the vehicle learns the user's driving times and patterns, instead of being instructed, or using definite times provided by the default schedule, the vehicle could use the learned driving and/or communication or other behavior of a driver, for example, open/close doors, turn on AC/heater, etc., and when not in use by the user, run some other tasks. For example, based on learned user behavior, If the user does not use the vehicle at a certain time and/or for a certain period of time, for example, sleeping at night, it may power up. If the user is not using the device for an extended period of time, for example, the user is on vacation, go into deep sleep. If it's a weekend or weekday, go into lower power mode so that when the user gets in the car, he has more power available for driving longer distances. As the vehicle learns, it uploads the updated schedules to the server.

Figure 9:
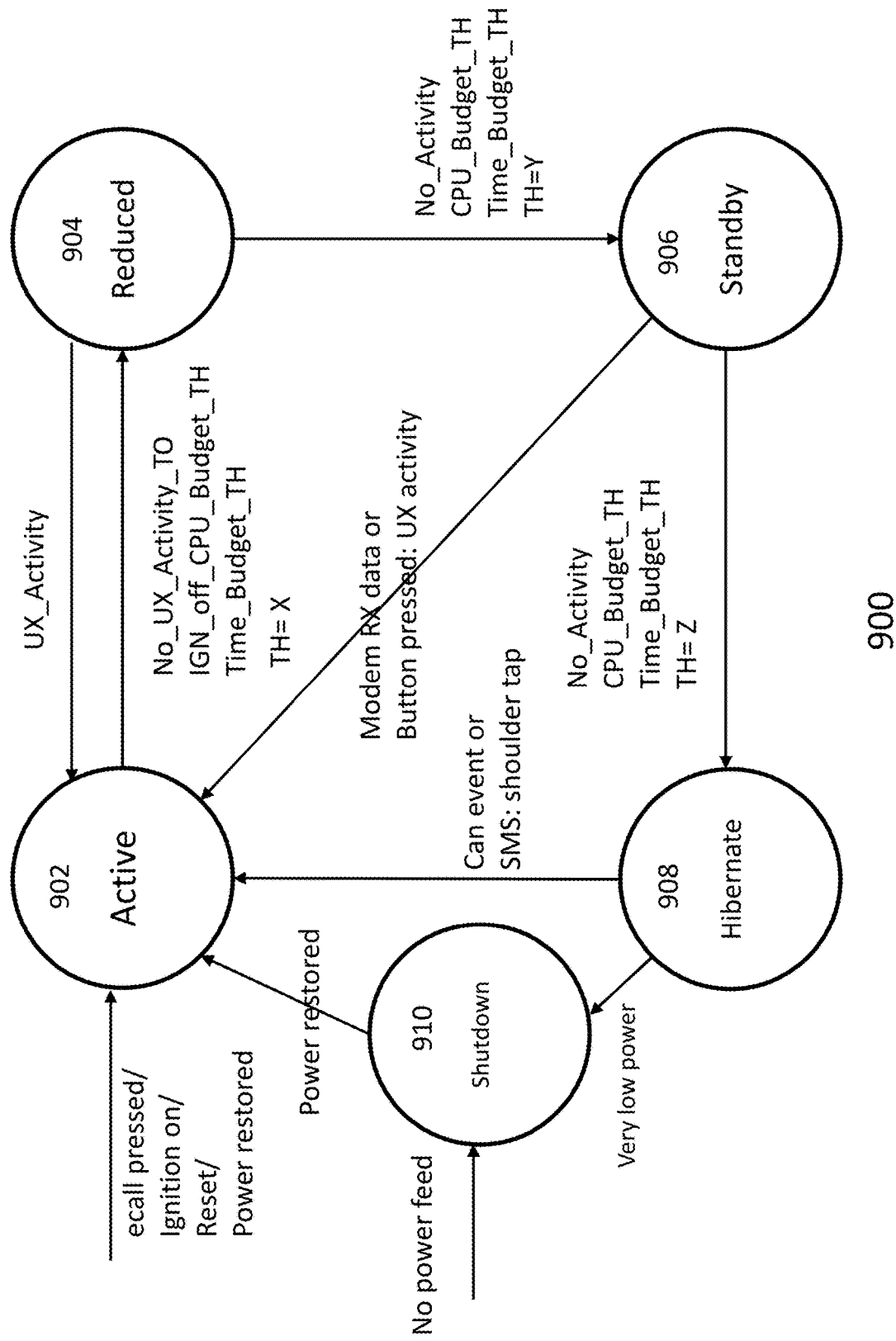
FIG. 9 illustrates example target device transition states used in the method for selecting an optimal approach for establishing communications according to one or more embodiments of the present invention.

This can be achieved by first downloading the power and connection management transition diagram, illustrated by FIG. 9 and power state definitions illustrated in Table 1 into the target device and let the device use those as default programming for power as well as connection management. These two default state configurations may be used to define power and communication management schedule, for example, the vehicle can stay in low power mode, not connected between time x and time y, etc.

Figure 10:
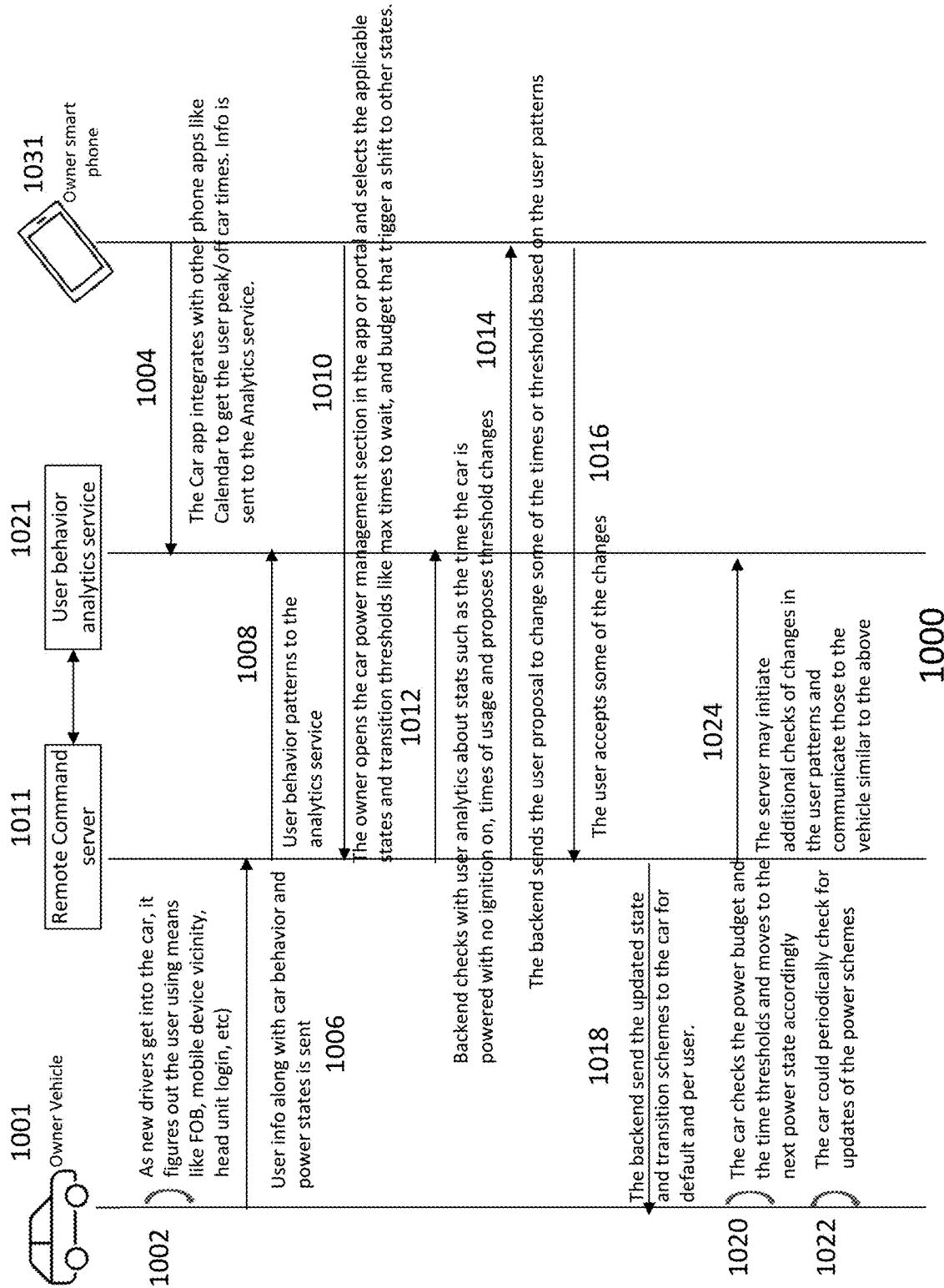
FIG. 10 illustrates an example method for learning user behavior for selecting an optimal approach for establishing communications according to one or more embodiments of the present invention.

Although the system is provided with the default values to begin with as described above, once in use, the system starts to learn user behavior based on usage of the IoT device by that user, for example, user's work schedule, if the user is at home, if the user switched to a night shift, if the user is on vacation, if it is a weekend, typical user behavior on a weekend to name a few and then provide instructions to configure the vehicle TCU/ECU for optimal power management and connection management in such situations. Learning of user behavior over time is illustrated in FIG. 10 and described in detail in the description accompanying FIG. 10.

Various attributes of user behavior may include any one or more of; one or more of: location of the target device (vehicle), location of a remote device containing the remote application, proximity of the remote device to the target device, time of the day, day of the week, a type of command issued, time/day/date the vehicle is driven, geographical location of the vehicle being driven, destination of the vehicle being driven on a particular day of the week, time of the day, day of the month, holiday schedule, outside temperature, etc., location of the user in relation to the location of the vehicle or distance between the user and the vehicle, etc. Some of these attributes may be deduced from the location and/or other information on the user's phone, for example, if the user is very far from the vehicle for a period of time, it may indicate to the system that the user is on vacation.

This information may provide user behavior patterns under different circumstances, for example, during a pandemic, the car is not driven much, in which case, there is excess battery power available since it is not being used by the car for driving that may be donated back to the grid or to the house if there is a power outage.

Additionally, the vehicle app may integrate or communicate with other phone apps like calendar to get the user peak/off-peak usage times, etc. For example, the vehicle app may read the calendar of the user, learn that there is a meeting and that the location of the meeting is away from the current location of the vehicle. If the user needs to get to the location and it is very cold outside and the car isn't warmed up, the vehicle may power up and turn on climate control to warm up the vehicle cabin. In another example, the vehicle app may capture external information like the location of the user in relation to the car. Additional inputs like user location, calendar, profile, etc. may also be sent to the user behavior analytics service and used for heuristics.

The user behavior analytics service may consider all of these inputs to prepare a schedule that optimizes power management and communication connection or other vehicle usage, for example, climate control, and push it to the vehicle on a regular basis. The user behavior analytics service may ask for details back and make changes. Thus, in an embodiment, rather than learning the user behavior by the server such as user behavior analytics service in the cloud and then downloading it to the vehicle, the vehicle itself may learn the user behavior and store it for future use to make decisions regarding optimization of power management and usage of vehicle services. In an embodiment, different levels of distribution of the user behavior analytics service may be employed. For example, the user behavior analytics service may be mostly running in the cloud, mostly distributed in the vehicles, or a hybrid system, where some functions may be performed in cloud whereas other functions may be performed in the vehicle itself. Benefits of the cloud and hybrid modes is the ability to make decision based on more than single device users, for example, looking at driving patterns of users of the same age and location.

In an embodiment, interruptions to the schedule may also be configured based on the necessity to do so. For example, if the vehicle contacts the server, the server can override and replace the power configuration with something else if it needs to. This could happen when the policy changes, such as when the server pushes an OTA update. This concept ties in with in-vehicle architecture. In another example, if the time or power budget goes below a certain threshold, the vehicle must drop into a certain power state. Although many devices currently switch to a power saving mode as the device power drops below a certain threshold, the power saving mode implemented herein may be determined by the user behavior patterns established by the analytics service and configuration associated with the 'power state transition' as illustrated in FIG. 9.

In one or more embodiments, the method and system described herein may provide additional functionality for the vehicle, such as performing operations based on proximity to the user's location in relation to the vehicle, if the power configuration/schedule allows for use of some extra power.

For example, if the user of the vehicle is finishing work, going down the elevator, approaching the parking lot, the car may be configured/programmed to automatically turn on the headlights or unlock the door. The vehicle may know based on user behavior the time the user usually leave work, and how close the user is to the vehicle, etc. and based on location data that the user is moving. Various combinations of patterns may enable the method and system described herein to provide these additional services.

In another example, the user is listening to Spotify on their phone. As the user approaches the vehicle, the service may be automatically turned on in the car for an uninterrupted user experience.

In yet another example, the user is driving the car with GPS turned on. When the user gets close to their destination, if the user is not able to park right at his destination, the vehicle may send instructions to the user's phone to give him directions to complete the journey, whether via bus or walking or any other option.

Although a few examples are provided above, a person skilled in the art may readily understand that additional functionalities not enumerated herein may also be provided by the method and system described herein and is also within the spirit and scope of this invention.

When the vehicle is plugged into the charger and is not being used, part of the power may be used to optimize the power management and connection management configuration/schedule or it can be used to contribute resources for other purposes. Similarly, as the vehicle switches from cellular network connection to WIFI, as the vehicle reaches home may also be managed based on learned user behavior and connectivity information available to the vehicle.

Optimizing power management and connection management for better user experience may include, for example, if a vehicle is plugged into the charger and it is midnight, the vehicle may be programmed to go into higher power processing and run some machine learning. Methods used may include (a) high power mode for rapid CPU and large memory/storage access (b) rapid internet using the charger ethernet or fast wireless technology. Because it is anticipated, either by default or via programming and/or machine learning, that the owner/driver of the car will not need the car at that time and since it is plugged in, the car will not run out of power. Jobs such as downloading data including but not limited user behavior, updated schedule, lengthy computation of large and complex routes anticipated for the user or driver (or selected by the driver) that will save the wait of users when actually interacting with the applications on the road, or when not connected to the charger, etc. may be scheduled based on the conditions from the car's current power and events from the car, and vice versa.

Additionally or alternatively, the vehicle may optimize for reduced costs to the user. For example, when a vehicle is plugged into the charger and it is midnight, the vehicle may be programmed to go into higher power processing and/or load large applications and/or data sets to save costs for the user. Methods used may include (a) high power state for rapid CPU and large memory/storage access (b) rapid internet using the charger ethernet or fast wireless technology. Because it is anticipated, either by default or via machine learning, that the owner/driver of the car will not need the car at that time and since it is plugged in, the car will not run out of power. For example, large downloads of images, maps, movies, and music that may save cellular costs when actually interacting with the applications on the road, or when not connected to rapid network, may be scheduled based on the conditions from the car's current power and events from the car, and vice versa.

In another example, on the weekends, when the car is parked most of the time, a power configuration/schedule may be provided that instructs the car to be disconnected and go into low power state so that when the owner/driver (user) of the vehicle returns to the car, they will be able to drive it further due to more charge in the vehicle.

The device power configuration may include a sub-configuration for each ECU or TCU in the vehicle. Each sub-configuration, for example, can have multiple CPU power states as part of their configuration. For example, a power state may be, for example, Active—High CPU, full or high power state, connected to the network, WIFI, GPS, and CAN are on; Reduced—Low CPU, lower power state than the full power state, but still considered as high power state and still running all modules and connected to the network; Standby—The app processors are off. Memory is kept. The modem is on mostly in low power DRX mode, CAN is on, the rest of the modules are powered off; Hibernate—The app processors are off. Memory is stored on persistent storage and powered off. The modem is in low power consumption and can accept SMS for wakeup, CAN is on, the rest of the modules are powered off; and Shutdown—All modules are powered off as illustrated in Table 1: Power States below as an example of various device states. The device power schedule may include powering up and using CPU when it is time to do so and powering down when not needed.

TABLE 1

Power States

| State | App Processor | Memory | Modem (Substates) | | | | Wi-Fi | GPS | CAN | Comments |
|---|---|---|---|---|---|---|---|---|---|---|
| | | | CRX | DRX-short | DRX-long | DRX-paging | | | | |
| Active | On | On | ✓ | ✓ | ✓ | ✓ | On | On | On | |
| Reduced | Reduced | On | ✓ | ✓ | ✓ | ✓ | On | On | On | IO is working (music stream), no user action. Reduced clock and/or cores |
| Standby | Off | On | ✓ | ✓ | ✓ | ✓ | Off | Off | On | Waiting for Activity |
| Hibernate | Off | Off (moved to persistent store) | X | X | X | X (SMS on) | Off | Off | On | Below power budget threshold |
| Shutdown | Off | Off (no persistence) | X | X | X | X | Off | Off | Off | No Power Feed |

FIG. 9 illustrates example target device transition states 900 used by the method for selecting an optimal approach for establishing communications according to one or more embodiments of the present invention. For example, as described in Table 1, the device power configuration may include a sub-configuration for each ECU or TCU in the vehicle. Each sub-configuration can have multiple CPU/component power states as part of their configuration. The power state of the device may transition from one state to another based on various criteria. For example, the power state of the device may be active state 902 when emergency call (e-call) is pressed or ignition is on or a reset button is pressed where CPU usage is high, the device is in full power mode, connected to the network or WIFI, and GPS, and CAN are on. The power state of the device may transition to reduced state 904 from active state 902 when there is no user activity for a predetermined period of time, ignition is off and CPU usage threshold was reached, and/or time passed a threshold in the active state or the charge level reached a threshold. Those are illustrated as IGN_off_CPU_Budget_TH for the threshold related to being with IGN Off and using CPU up to a certain extent, Time_Budget_TH. Any of the parameters including thresholds and time outs etc. described herein may be defined by the programmer and/or the user of the device the threshold related to the charge value is illustrated as TH=X, and the threshold related to the user activity idle time is No_UX_Activity_TO (no user activity for a specified amount of time and hence timed out).

The reduced state 904 transitions to the active state 902 as soon as there is user activity or the ignition is turned on or resent button is pressed, or e-call is invoked.

The power state of the device may transition to standby state 906, from reduced state 904 when there is no activity, CPU up time exceeded a or time in the state exceed a threshold illustrated as CPU_Budget_TH, Time_Budget_TH, where these and other thresholds in all cases may be defined by the programmer and/or the user of the device, illustrated as TH=Y the charge level may also be compared to a threshold. The standby state 906 transitions to the active state 902 as soon as there is user activity or the device receives modem RX data.

The power state of the device may transition to hibernate state 908 from standby state 906, when there is no activity, threshold for CPU usage as well as connection time reaching a threshold, or reaching to battery charge level, illustrated as NO_Activity, CPU_Budget_TH, Time_Budget_TH, and TH=Z, where the threshold may be defined by the programmer and/or the user of the device where the app processors are off, memory is stored on persistent storage and powered off, the modem is in low power consumption and can accept SMS for wakeup, CAN is on, and the rest of the modules are powered off. The hibernate state 908 transitions to the active state 902 as soon as there is CAN event or SMS is received as a shoulder tap.

The power state of the device may transition to shutdown state 910 from hibernate state 908 when the device power or power profile is below a predetermined threshold or very low, where all modules are powered off.

The power state of the device may transition from shutdown state 910 to active state 902 when the power to the device is restored. Additionally or alternatively, the power state of the device may transition from any of the states other than active state 902 to the active state 902 when the power to the device is restored.

FIG. 10 illustrates an example method 1000 for learning user behavior for selecting an optimal approach for powering on components and establishing communications according to one or more embodiments of the present invention. For example, when a new user/driver starts using the vehicle 1001, the vehicle 1001 may create and/or associate a particular user with a user behavior profile for that user using various means such as but not limited to FOB, mobile device vicinity, head unit login etc. via step 1002. The vehicle 1001 sends the user information along with the user and/or device behavior information and power states to the backend, which may include a remote command server 1011, which may relay it to the user behavior analytics service 1021 via steps 1006 and 1008. In an embodiment, the user behavior analytics service 1021 may include a database or a database with some computing power and/or a server and may work in concert with the remote command server 1011. In an embodiment, the remote command server 1011 may be part of user behavior analytics service 1021 or separate from user behavior analytics service 1021.

Additionally, the vehicle app may integrate with other phone apps like calendar to get information such as but not limited to the user peak/off-peak usage times, etc. This information is sent to the user behavior analytics service 1021 via step 1004. For example, from the information included in the user's calendar, the vehicle app may learn that there is a meeting and how far the location of the meeting is from the current location of the vehicle. If the user needs to get to the location and it is very cold outside and the car isn't warmed up, the vehicle 1001 may power up and turn on climate control to warm up the vehicle cabin. In another example, the vehicle app may capture external information like the location of the user in relation to the car. Additional inputs like user location, calendar, profile, etc. may also be sent to the user behavior analytics service 1021 via step 1008 and used for heuristics.

The user behavior analytics service 1021 may consider all of these inputs to prepare a schedule that optimizes power management and communication connection or other vehicle usage, for example, climate control, and deliver it to the vehicle on a regular basis via the remote command server 1011. The user behavior analytics service 1021 may ask for details back and update its model. In addition, the user behavior analytics service could also run on the vehicle. Thus, in an embodiment, rather than learning the user behavior by the server such as user behavior analytics service 1021 in the cloud and then downloading it to the vehicle, the vehicle itself may learn the user behavior and store it for future use to make decisions regarding optimization of power management and usage of vehicle services.

The user may access the vehicle power management section in the app or user portal and select the applicable states and transition thresholds such as but not limited to maximum times to wait, and budget that trigger a shift to other states via step 1010. The remote command server 1011 may check statistics such as but not limited to the time the vehicle is powered with no ignition on, times of usage, etc. with the user behavior analytics service 1021 and propose threshold changes via step 1012. The remote command server 1011 may send the user a proposal to change some of the times or thresholds based on the learned user patterns via step 1014. If the user accepts the changes via step 1016, the remote command server 1011 sends the updated state and transition schemes to the vehicle for that particular user via step 1018.

The vehicle 1001 may check the power budget and the time thresholds and move to the next power state accordingly via step 1020. The vehicle 1001 may periodically check for updates of the power schemes via step 1022. Additionally or alternatively, the server 1011 may initiate additional checks of changes in the user patterns and communicate those to the vehicle similar to the ones described above in step 1012.

Figure 11:
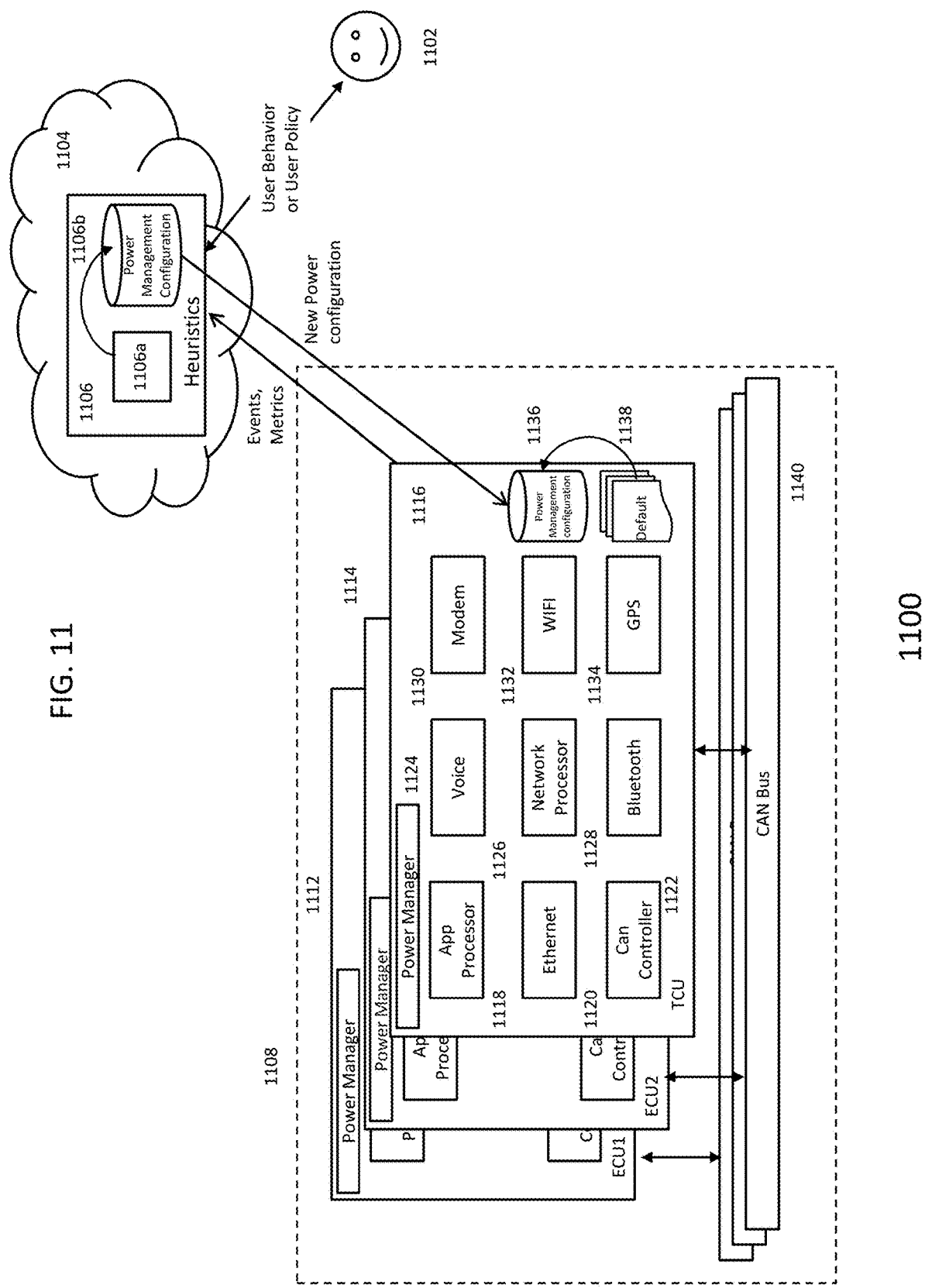
FIG. 11 illustrates an example system used for learning user behavior for selecting an optimal approach for establishing communications according to one or more embodiments of the present invention.

FIG. 11 illustrates an example system 1100 used for learning and using user behavior for selecting an optimal approach for establishing communications and optimize the power management of different car component, illustrated and described above in FIGS. 5-8 and 10, according to one or more embodiments of the present invention. The system includes a user behavior analytics service 1106, an IoT device 1108, and a remote device 1102. The user behavior analytics service 1106 further includes at least one server 1106*a*, at least one database 1106*b*. The backend 1104 may also include one or more remote command services. The IoT device 1108 further includes a telematics/transmission control unit (TCU) 1116, one or more electronic control units (ECU's) 1112, 1114, etc., and a communication module 1140, for example, a CAN bus, that allows the one or more electronic control units 1112, 1114, etc., to communicate with each other and with the IoT device 1112. The TCU 1116 may further include an application processor 1118 and at least one another communication module, for example, any one or more of: voice 1124, modem 1130, ethernet 1118, WiFi 1132, Bluetooth 1128, GPS 1134, CAN controller 1120, network processor 1126 etc. The external communication modules, for example, modem 1130, allow the TCU 1116 to communicate with the user behavior analytics service 1106.

Figure 12:
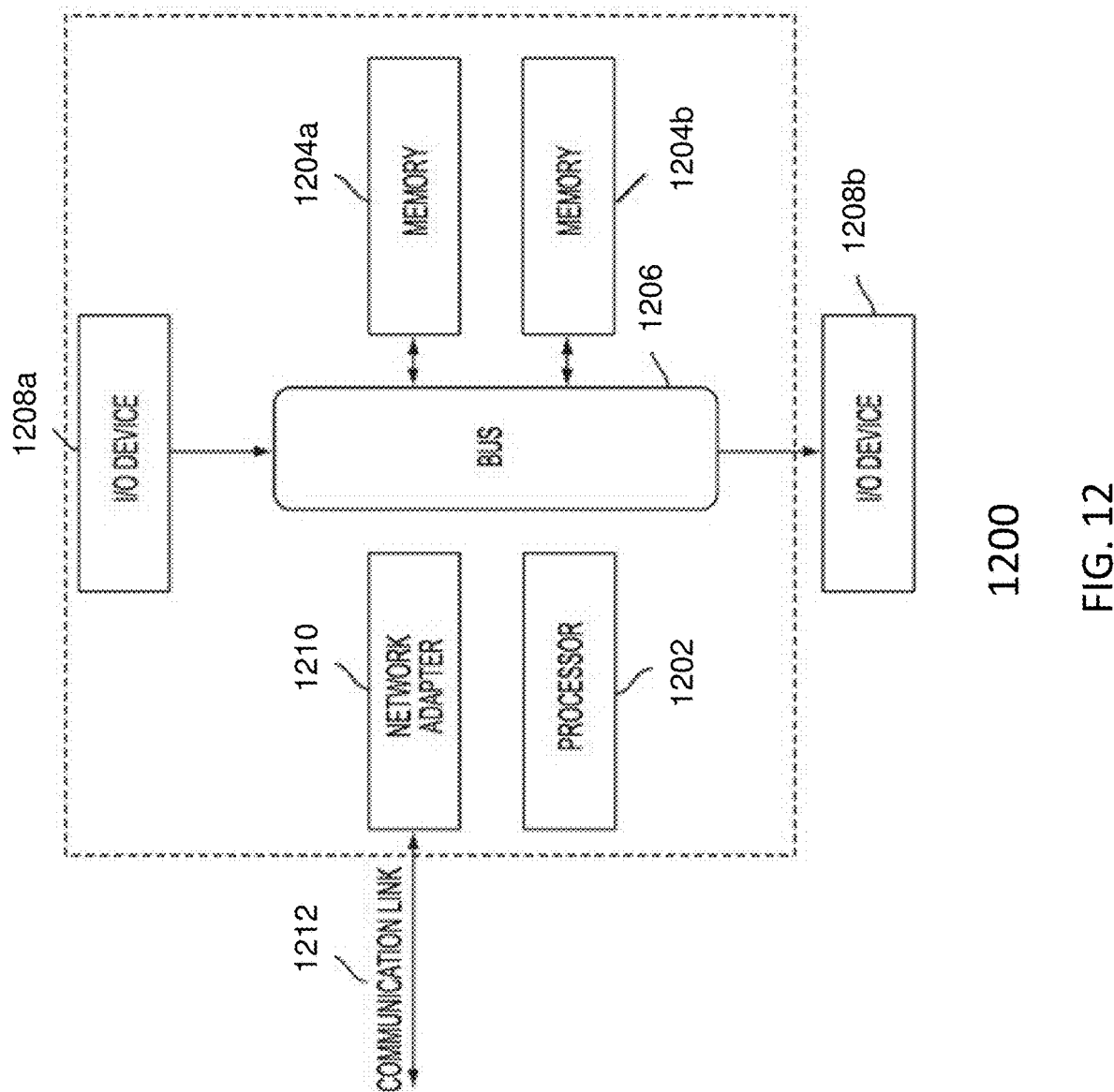
FIG. 12 illustrates a data processing system 1200 suitable for storing the computer program product and/or executing program code relating to the choices of the users in accordance with an embodiment of the present invention.

A further embodiment of the present invention that includes a computer program product system having a method for selecting one or more approaches to establishing a data connection that optimize the balance between rapid execution of user commands and effective management of use of power and communications resources depending on situational characteristics, including but not limited to, power profile of the device and user behavior analytics, is provided in accordance with the present invention. FIG. 12 illustrates a data processing system 1200 suitable for storing the computer program product and/or executing program code in accordance with one or more embodiments of the present invention. The data processing system 1200 includes a processor 1202 coupled to memory elements 1204*a-b* through a system bus 1206. In other embodiments, the data processing system 1200 may include more than one processor and each processor may be coupled directly or indirectly to one or more memory elements through a system bus.

Memory elements 1204*a-b* can include local memory employed during actual execution of the program code, bulk storage, and cache memories that provide temporary storage of at least some program code in order to reduce the number of times the code must be retrieved from bulk storage during execution. As shown, input/output or I/O devices 1208*a-b* (including, but not limited to, keyboards, displays, pointing devices, etc.) are coupled to the data processing system 1200. I/O devices 1208*a-b* may be coupled to the data processing system 1200 directly or indirectly through intervening I/O controllers (not shown).

In FIG. 12, a network adapter 1210 is coupled to the data processing system 1202 to enable data processing system 1202 to become coupled to other data processing systems or remote printers or storage devices through communication link 1212. Communication link 1212 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms device, target device, appliance, terminal, remote device, computer, server, wireless asset, smartphone, remote device, etc. are intended to be inclusive, interchangeable, and/or synonymous with one another and other similar communication-based or computing equipment for purposes of the present invention though one will recognize that functionally each may have unique characteristics, functions and/or operations which may be specific to its individual capabilities and/or deployment.

Similarly, it is envisioned by the present invention that the term "communications", "wireless' or "cellular" network includes communications across a network (such as that of a network for M2M communication but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, 5G, wireless local area network (WLAN), and one or more wired networks.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application or similar while the primary software and data are stored on servers or locations apart from the devices.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for optimizing user experience and power management comprising:
    determining power profile of a target device;
    determining historical behavior of at least one user in relation to the target device;
    considering the historical behavioral data of the at least one user in relation to the target device based on the determined power profile of the target device;
    using rules to select at least one of a plurality of approaches for establishing connection with a server in relation to a result of the considering; and
    establishing the connection with the target device based on the at least one of the plurality of approaches selected.

2. The method of claim 1, wherein determining the historical behavior of at least one user in relation to the target device is based on a set of parameters, wherein the set of parameters comprises any of: location of the target device, location of a remote device containing the remote application, proximity of the remote device to the target device, time of the day, day of the week, holiday schedule, outside temperature, a type of command issued and a combination thereof, when the at least one user issues a command.

3. The method of claim 2, wherein using rules to select at least one of a plurality of approaches for establishing connection with the server further comprises:
    determining a probability that the at least one user will issue a remote command based on historical behavior of the at least one user with respect to the set of parameters.

4. The method of claim 2 further comprising, providing additional services based on typical user behavior and any one or more from the set of parameters, wherein the additional service includes any one or more of: turning on headlights, lock-unlock doors, climate control, transferring service from the remote device to the target device for uninterrupted user experience, large downloads of data, and data processing based on power and CPU requirement.

5. The method of claim 3, wherein the selected at least one of the plurality of approaches includes proactively establishing connection with the server based on typical historical behavior of at least one user in relation to the target device with respect to the set of parameters, for the remote application to issue commands to the target device.

6. The method of claim 1, wherein the rules for selecting at least one of plurality of approaches comprises:
    if the determined power profile of the target device is a first predetermined profile, the target device establishes a connection for receiving commands when the device reads the power profile and determines that it is the first predetermined profile;
    if the determined power profile of the target device is a second predetermined profile, the target device establishes a connection for receiving commands based on the historical behavior of the at least one user in relation to the target device; and
    if the determined power profile of the target device is a third predetermined profile, the target device establishes a connection for receiving commands only when the at least one user issues a command.

7. The method of claim 6, wherein the first predetermined profile further comprises:
    determining that the power profile of the target device is any of: stored power level equal to or above a first predetermined percentage and the target device receiving a continuous supply of power through a power supply.

8. The method of claim 6, wherein the second predetermined profile further comprises:
    determining that the power profile of the target device is stored power level equal to or above a second predetermined percentage and below the first predetermined percentage.

9. The method of claim 6, wherein the third predetermined profile further comprises:

determining that the power profile of the target device is stored power level below the second predetermined percentage.

10. The method of claim 1, wherein establishing connection with the server further comprises powering up one or more components of the target device.

11. A system for optimizing user experience and power management comprising a target device, at least one database and at least one server, the at least one server including a processor, a memory in communication with the processor,
   wherein the at least one server determines historical behavior of at least one user based on a set of parameters related to the target device; and
      wherein the target device determines a power profile of the target device,
      considers historical behavioral data of the at least one user based on the determined power profile of the target device,
      uses rules to select at least one of a plurality of approaches for establishing connection with the at least one server in relation to a result of the considering; and
      establishes the connection with the target device based on the at least one of the plurality of approaches selected.

12. The system of claim 11, wherein determining the historical behavior of at least one user in relation to the target device is based on a set of parameters, wherein the set of parameters comprises any of: location of the target device, location of a remote device containing the remote application, proximity of the remote device to the target device, time of the day, day of the week, holiday schedule, outside temperature, a type of command issued and a combination thereof, when the at least one user issues a command.

13. The system of claim 12, wherein using rules to select at least one of a plurality of approaches for establishing connection with the at least one server further comprises:
   determining a probability that the at least one user will issue a remote command based on historical behavior of the at least one user with respect to the set of parameters.

14. The system of claim 12 further comprising, providing additional services based on typical user behavior and any one or more from the set of parameters, wherein the additional service includes any one or more of: turning on headlights, lock-unlock doors, climate control, transferring service from the remote device to the target device for uninterrupted user experience, large downloads of data, and data processing based on power and CPU requirement.

15. The system of claim 12, wherein the selected at least one of the plurality of approaches includes proactively establishing connection with the at least one server based on typical historical behavior of at least one user with respect to the set of parameters, for the remote application to issue commands to the target device.

16. The system of claim 11, wherein the rules for selecting at least one of plurality of approaches comprises:
   if the determined power profile of the target device is a first predetermined profile, the target device establishes a connection for receiving commands when the device reads the power profile and determines that it is the first predetermined profile;
   if the determined power profile of the target device is a second predetermined profile, the target device establishes a connection for receiving commands based on the historical behavior of the at least one user; and
   if the determined power profile of the target device is a third predetermined profile, the target device establishes a connection for receiving commands only when the at least one user issues a command.

17. The system of claim 16, wherein the first predetermined profile of the target device further comprises:
   determining that the power profile of the target device is any of: stored power level equal to or above a first predetermined percentage and the target device receiving a continuous supply of power through a power supply.

18. The system of claim 16, wherein the second predetermined profile further comprises:
   determining that the power profile of the target device is stored power level equal to or above a second predetermined percentage and below the first predetermined percentage.

19. The system of claim 16, wherein the third predetermined profile further comprises:
   determining that the power profile of the target device is stored power level below the second predetermined percentage.

20. The system of claim 11, wherein establishing connection with the at least one server further comprises powering up one or more components of the target device.

21. A non-transitory computer-readable medium having executable instructions stored therein that, when executed, cause one or more processors corresponding to a system having a target device, a database and a server, the server including a processor, a memory in communication with the processor, to perform operations comprising:
   determining historical behavior of at least one user;
   determining a power profile of the target device;
   considering historical behavioral data of the at least one user based on the determined power profile of the target device;
   using rules to select at least one of a plurality of approaches for establishing connection with a server in relation to a result of the considering; and
   establishing the connection with the target device based on the at least one of the plurality of approaches selected.

22. The non-transitory computer-readable medium of claim 21, wherein the operation for determining the historical behavior of at least one user is based on a set of parameters, wherein the set of parameters comprises any of: location of the target device, location of a remote device containing the remote application, proximity of the remote device to the target device, time of the day, day of the week, holiday schedule, outside temperature, a type of command issued and a combination thereof, when the at least one user issues a command.

23. The non-transitory computer-readable medium of claim 22, wherein the operations for using rules to select at least one of a plurality of approaches for establishing connection with the server further comprises:
   determining a probability that the at least one user will issue a remote command based on historical behavior of the at least one user with respect to a set of parameters.

24. The non-transitory computer-readable medium of claim 22 further comprising, providing additional services based on typical user behavior and any one or more from the set of parameters, wherein the additional service includes any one or more of: turning on headlights, lock-unlock doors, climate control, transferring service from the remote device to the target device for uninterrupted user experience, large downloads of data, and data processing based on power and CPU requirement.

25. The non-transitory computer-readable medium of claim 22, wherein the selected at least one of the plurality of approaches includes proactively establishing connection with the server based on typical historical behavior of at least one user with respect to the set of parameters, for the remote application to issue commands to the target device.

26. The non-transitory computer-readable medium of claim 21, wherein the rules for selecting at least one of plurality of approaches comprises:
   if the determined power profile of the target device is a first predetermined profile, the device establishes a connection for receiving commands when the device reads the power profile and determines that it is the first predetermined profile;
   if the determined power profile of the target device is a second predetermined profile, the target device establishes a connection for receiving commands based on the historical behavior of the at least one user; and
   if the determined power profile of the target device is a third predetermined profile, the target device establishes a connection for receiving commands only when the at least one user issues a command.

27. The non-transitory computer-readable medium of claim 26, wherein the first predetermined profile further comprises:
   determining that the power profile of the target device is any of: stored power level equal to or above a first predetermined percentage and the target device receiving a continuous supply of power through a power supply.

28. The non-transitory computer-readable medium of claim 26, wherein the second predetermined profile further comprises:
   determining that the power profile of the target device is stored power level equal to or above a second predetermined percentage and below the first predetermined percentage.

29. The non-transitory computer-readable medium of claim 26, wherein the third predetermined profile further comprises:
   determining that the power profile of the target device is stored power level below the second predetermined percentage.

30. The non-transitory computer-readable medium of claim 21, wherein the operation for establishing connection with the server comprises powering up one or more components of the target device.

* * * * *